US012795219B2

(12) United States Patent
Santos et al.

(10) Patent No.: US 12,795,219 B2
(45) Date of Patent: Nov. 10, 2026

(54) IMAGE CAPTURE APPARATUS INCLUDING THERMAL MANAGEMENT SYSTEM WITH EXTERNAL AND INTERNAL HEAT SINKS

(71) Applicant: GoPro, Inc., San Mateo, CA (US)

(72) Inventors: Adrian Santos, Lake Forest, CA (US); Nicholas Vitale, Foster City, CA (US); Akshay Shinde, Sunnyvale, CA (US); Raul Vargas Gonzalez, Foster City, CA (US)

(73) Assignee: GoPro, Inc., San Mateo, CA (US)

( * ) Notice: Subject to any disclaimer, the term of this patent is extended or adjusted under 35 U.S.C. 154(b) by 16 days.

(21) Appl. No.: 18/918,250

(22) Filed: Oct. 17, 2024

(65) Prior Publication Data

US 2025/0142192 A1 May 1, 2025

Related U.S. Application Data

(60) Provisional application No. 63/546,004, filed on Oct. 27, 2023, provisional application No. 63/546,006, filed on Oct. 27, 2023.

(51) Int. Cl.

| | |
|---|---|
| ***H04N 23/52*** | (2023.01) |
| ***H04N 23/51*** | (2023.01) |
| ***H04N 23/55*** | (2023.01) |

(52) U.S. Cl.

CPC ............. *H04N 23/52* (2023.01); *H04N 23/51* (2023.01); *H04N 23/55* (2023.01)

(58) Field of Classification Search

CPC ......... H04N 23/52; H04N 23/51; H04N 23/55

See application file for complete search history.

(56) References Cited

U.S. PATENT DOCUMENTS

| | | | |
|---|---|---|---|
| 751,347 | A | 2/1904 | Scheimpflug |
| 3,760,704 | A | 9/1973 | Baker |
| 3,818,498 | A | 6/1974 | Zehnpfennig |
| 4,109,263 | A | 8/1978 | Johnson |
| 4,119,980 | A | 10/1978 | Baker |
| 5,471,027 | A | 11/1995 | Call |
| 5,721,585 | A | 2/1998 | Keast |

(Continued)

FOREIGN PATENT DOCUMENTS

| | | | |
|---|---|---|---|
| CN | 101382636 | A | 3/2009 |
| CN | 101919247 | A | 12/2010 |

(Continued)

OTHER PUBLICATIONS

International Preliminary Report on Patentability issued in App. No. PCT/US2021/019970, mailing date Sep. 9, 2022, 6 pages.

(Continued)

*Primary Examiner* — Timothy J Henn

(74) *Attorney, Agent, or Firm* — Young Basile Hanlon & MacFarlane, P.C.

(57) ABSTRACT

An image capture apparatus that includes: a front housing; a rear housing that is connected to the front housing; and first and second heat sinks that are connected to the front housing. The front housing separates the first and second heat sinks to define an air gap therebetween, thereby insulating the first and second heat sinks from each other and rendering the first and second heat sinks devoid of any direct thermal connection.

20 Claims, 21 Drawing Sheets

(56) References Cited

U.S. PATENT DOCUMENTS

| | | | | |
|---|---|---|---|---|
| 5,864,365 | A * | 1/1999 | Sramek | G08B 13/19619 348/E5.026 |
| 6,097,598 | A | 8/2000 | Miyahara | |
| D467,259 | S | 12/2002 | Hung | |
| 6,726,331 | B2 | 4/2004 | Miyata | |
| 7,329,869 | B2 | 2/2008 | Cassel | |
| 8,149,327 | B2 | 4/2012 | Lin | |
| 8,274,550 | B2 | 9/2012 | Steuart, III | |
| 9,025,080 | B2 | 5/2015 | Samuels | |
| 9,185,279 | B2 | 11/2015 | Masuda | |
| 9,456,113 | B2 | 9/2016 | Masuda | |
| 9,607,358 | B2 | 3/2017 | Takenaka | |
| 9,736,372 | B2 | 8/2017 | Masuda | |
| 9,860,970 | B2 | 1/2018 | Tolbert | |
| 9,910,342 | B2 * | 3/2018 | Samuels | G03B 17/56 |
| 9,992,414 | B2 | 6/2018 | Masuda | |
| 10,382,681 | B2 | 8/2019 | Masuda | |
| 10,404,912 | B2 | 9/2019 | Ogawa | |
| 10,613,420 | B2 | 4/2020 | Ali | |
| 10,652,458 | B2 | 5/2020 | Kang | |
| 10,656,689 | B2 | 5/2020 | Kilgore | |
| 10,666,360 | B2 | 5/2020 | Saathoff | |
| 10,666,860 | B2 | 5/2020 | Takenaka | |
| 10,701,249 | B1 | 6/2020 | Guo | |
| 10,855,919 | B2 | 12/2020 | Masuda | |
| 10,855,979 | B2 | 12/2020 | Pace | |
| 11,146,711 | B1 | 10/2021 | Crow | |
| 11,277,545 | B2 | 3/2022 | Crow | |
| 12,075,141 | B2 | 8/2024 | Nicholas | |
| 12,081,848 | B2 | 9/2024 | Nicholas | |
| 12,432,431 | B2 * | 9/2025 | Amano | H04N 23/52 |
| 2002/0057337 | A1 | 5/2002 | Kumler | |
| 2003/0128536 | A1 | 7/2003 | Radu | |
| 2003/0202328 | A1 | 10/2003 | Deeney | |
| 2004/0169771 | A1 | 9/2004 | Washington | |
| 2005/0213960 | A1 * | 9/2005 | Baldwin | G03B 17/02 396/439 |
| 2006/0100336 | A1 | 5/2006 | Fukui | |
| 2007/0002131 | A1 | 1/2007 | Ritchey | |
| 2007/0062905 | A1 | 3/2007 | Hung | |
| 2008/0056695 | A1 | 3/2008 | Huang | |
| 2008/0205881 | A1 | 8/2008 | Sakurai | |
| 2009/0040291 | A1 | 2/2009 | Mccall | |
| 2009/0274953 | A1 | 11/2009 | Myers | |
| 2010/0045773 | A1 | 2/2010 | Ritchey | |
| 2010/0245539 | A1 | 9/2010 | Lin | |
| 2010/0296805 | A1 | 11/2010 | Mayer | |
| 2011/0127912 | A1 | 6/2011 | Lee | |
| 2011/0194009 | A1 | 8/2011 | Park | |
| 2012/0023177 | A1 | 1/2012 | Linden | |
| 2012/0035418 | A1 | 2/2012 | Talbert | |
| 2014/0049243 | A1 | 2/2014 | Huang | |
| 2014/0055671 | A1 | 2/2014 | Kawamura | |
| 2014/0160284 | A1 | 6/2014 | Achenbach | |
| 2014/0192144 | A1 | 7/2014 | St. Clair | |
| 2014/0218587 | A1 | 8/2014 | Shah | |
| 2015/0365569 | A1 | 12/2015 | Mai | |
| 2016/0212409 | A1 | 7/2016 | Cole | |
| 2016/0307372 | A1 | 10/2016 | Pitts | |
| 2016/0349601 | A1 | 12/2016 | Kungl | |
| 2017/0054907 | A1 | 2/2017 | Nishihara | |
| 2017/0070652 | A1 | 3/2017 | Müller | |
| 2017/0156205 | A1 | 6/2017 | Liu | |
| 2017/0195531 | A1 | 7/2017 | Warren | |
| 2017/0195533 | A1 | 7/2017 | Seo | |
| 2017/0200992 | A1 | 7/2017 | Piggott | |
| 2017/0294694 | A1 | 10/2017 | Tso | |
| 2018/0070003 | A1 | 3/2018 | Ramseyer | |
| 2018/0107099 | A1 | 4/2018 | Yasuda | |
| 2018/0259831 | A1 | 9/2018 | Chiu | |
| 2019/0041600 | A1 | 2/2019 | Sakamoto | |
| 2019/0056643 | A1 | 2/2019 | Chang | |
| 2019/0163037 | A1 | 5/2019 | Koyama | |
| 2019/0346126 | A1 | 11/2019 | Wada | |
| 2020/0033774 | A1 | 1/2020 | Shinji | |
| 2020/0064533 | A1 | 2/2020 | Miyazaki | |
| 2020/0144764 | A1 | 5/2020 | Hanselmann | |
| 2020/0351419 | A1 * | 11/2020 | Sharma | H04N 23/55 |
| 2020/0413567 | A1 | 12/2020 | Chusseau | |
| 2021/0033815 | A1 | 2/2021 | Lin | |
| 2021/0111210 | A1 * | 4/2021 | Vitale | H10F 39/8063 |
| 2021/0122299 | A1 | 4/2021 | Garcia | |
| 2021/0254820 | A1 | 8/2021 | Spiro | |
| 2021/0306536 | A1 | 9/2021 | Nicholas | |
| 2022/0124226 | A1 | 4/2022 | Jeong | |
| 2023/0009451 | A1 | 1/2023 | Connolly | |
| 2024/0073506 | A1 | 2/2024 | Nicholas | |
| 2024/0155255 | A1 | 5/2024 | Griggs | |
| 2024/0323532 | A1 | 9/2024 | Abe | |
| 2024/0414422 | A1 | 12/2024 | Nicholas | |
| 2024/0422413 | A1 * | 12/2024 | Vitale | H04N 23/52 |
| 2025/0056106 | A1 | 2/2025 | Nicholas | |
| 2026/0082113 | A1 | 3/2026 | Nicholas | |

FOREIGN PATENT DOCUMENTS

| | | | | |
|---|---|---|---|---|
| CN | 206042150 | U | 3/2017 | |
| CN | 107155053 | A | 9/2017 | |
| CN | 109073959 | A | 12/2018 | |
| EP | 3985959 | A1 * | 4/2022 | H04N 23/51 |
| JP | 2004020798 | A | 1/2004 | |
| JP | 2006086752 | A | 3/2006 | |
| JP | 2008015476 | A | 1/2008 | |
| JP | 2009105478 | A | 5/2009 | |
| JP | 2009278584 | A | 11/2009 | |
| JP | 2012123025 | A | 6/2012 | |
| JP | 5322866 | B2 | 10/2013 | |
| JP | 2017073634 | A | 4/2017 | |

OTHER PUBLICATIONS

International Preliminary Report on Patentability issued in App. No. PCT/US2021/026140, mailing date Oct. 20, 2022, 8 pages.

International Search Report and Written Opinion for App. No. PCT/US2021/019970, dated Jun. 3, 2021, 9 pages.

International Search Report and Written Opinion for App. No. PCT/US2021/026140, dated Jul. 1, 2021, 10 pages.

U.S. Appl. No. 16/803,139, filed Feb. 27, 2020, Crow et al.

Randall Hand, "Immersive Media's Dodeca 2360 Spherical Video Camera", VizWorld, Nov. 12, 2025, 4 pages.

The Magazine of Panoramic Imaging, Jun.-Jul. 1996, vol. 13, No. 3, 20 pages.

The Magazine of Panoramic Imaging, Mar.-Apr. 1996, vol. 13, No. 2, 20 pages.

* cited by examiner

IMAGE CAPTURE APPARATUS INCLUDING THERMAL MANAGEMENT SYSTEM WITH EXTERNAL AND INTERNAL HEAT SINKS

CROSS-REFERENCE TO RELATED APPLICATION(S)

This application claims the benefit of and priority to U.S. Provisional Patent Application Ser. No. 63/546,004, filed Oct. 27, 2023, and U.S. Provisional Patent Application Ser. No. 63/546,006, filed Oct. 27, 2023, the entire contents of which are hereby incorporated by reference.

TECHNICAL FIELD

The present disclosure relates to an image capture apparatus with a thermal management system that includes multiple (i.e., external and internal) heat sinks, which facilitate the direct, active cooling of various internal, heat-generating components in order to dissipate thermal energy to an external environment.

BACKGROUND

Image capture apparatuses include various features that provide a multitude of techniques to capture images in a variety of applications including, for example, handheld cameras and video recorders, cell phones, drones, vehicles, etc. Modern image capture apparatuses typically include one or more lenses (or other such optical elements) and one or more image sensors. The lens(es) capture content by receiving and focusing light, and the image sensor(s) convert the captured content into an electronic image signal that is processed by an image signal processor to generate an image. In some image capture apparatuses, the lens(es) and the image sensor(s) are integrated into a single unit, which is known as an integrated sensor-lens assembly (ISLA). In addition to the ISLA(s), image capture apparatuses include an array of internal components, both structural and electrical, and one or more heat sinks, which dissipate the heat that is generated during use.

The image sensor(s), among other components, generate considerable thermal energy that can reduce the run (operation) time of the image capture apparatus. Due to the complex configuration of modern image capture apparatuses and the limited space available for internal components, managing the thermal loads can be challenging. One solution is to include an external heat sink, which can be challenging when the image capture apparatus includes multiple lenses and/or visual components (e.g., display screens). Additionally, external heat sinks can often become too hot in a relatively short amount of time.

As such, an opportunity remains to improve the heat dissipation and cooling of an image capture apparatus and, thus, the operability thereof (e.g., by increasing the run time). The present disclosure addresses this opportunity by providing an image capture apparatus that is configured for increased air flow therethrough and which includes a thermal management system with both external and internal heat sinks.

SUMMARY

In one aspect of the present disclosure, an image capture apparatus is disclosed that includes: one or more heat generating components; an internal heat sink that is thermally coupled with the one or more heat generating components; a housing that encloses the one or more heat generating components and an internal surface of the internal heat sink; and an external heat sink that is connected with the housing. The external heat sink comprises a support and fins that define spaces within the support at a ventilation location of the internal heat sink so that the spaces expose an external surface of the internal heat sink to allow heat dissipation to external fluids.

In certain embodiments, the external surface of the internal heat sink may be free of contact with the fins so that the ventilation location is located between the external surface of the internal heat sink and the fins.

In certain embodiments, the ventilation location and the spaces between the fins may form a pathway that allows fluids to move from the internal heat sink to an external environment so that thermal energy is transferred between the internal heat sink and the external environment.

In certain embodiments, the image capture apparatus may further include one or more lens barrels that extend through a portion of the external heat sink, the housing, and/or the internal heat sink.

In certain embodiments, the one or more lens barrels may include a pair of image sensors that are configured to generate thermal energy and which are thermally coupled with the internal heat sink at different positions on the internal portion of the heat sink.

In certain embodiments, the internal heat sink may include: a front internal heat sink that connects with the one or more heat generating components and which comprises the external surface and a part of the internal surface; a rear internal heat sink that connects with the pair of image sensors and which comprises another part of the internal surface; and flanges that thermally couple the front and rear internal heat sinks.

In certain embodiments, the flanges may overlap to form a thermal coupling.

In certain embodiments, the flanges may be connected by a fastener that is configured to facilitate transfer of thermal energy to the external environment.

In another aspect of the present disclosure, an image capture apparatus is disclosed that includes: a housing that comprises a receptacle defined by walls; a printed circuit board that is enclosed within the housing and which comprises heat generating components; an internal heat sink that is enclosed within the housing and which is thermally coupled with one or more of the heat generating components; and an external heat sink that is connected with the housing at the receptacle and at or below the walls. The external heat sink defines a plurality of spaces at a location of the internal heat sink so that the internal heat sink is partially exposed to an external environment.

In certain embodiments, the housing and/or the internal heat sink may include a gasket or a mount that is configured to integrate with a different gasket of the external heat sink so that fluids are prevented from entering the housing.

In certain embodiments, the printed circuit board and the internal heat sink may be free of contact.

In certain embodiments, the heat generating components and the internal heat sink may be thermally coupled through a conductor or a thermal interface material so that a space is present between the printed circuit board and the internal heat sink.

In certain embodiments, the internal heat sink may include a front heat sink and a rear heat sink.

In certain embodiments, the front heat sink may be connected with the heat generating components and may be positioned between the printed circuit board and the external heat sink.

In certain embodiments, the rear heat sink may be connected with the front heat sink and may be positioned between the printed circuit board and the housing.

In certain embodiments, the image capture apparatus may further include a lens barrel that extends through a portion of the internal heat sink, the external heat sink, and the housing.

In certain embodiments, the lens barrel may comprise an image sensor that is thermally coupled with the rear heat sink.

In certain embodiments, the image capture apparatus may further include a gasket that encloses at least some of the heat generating components between the internal heat sink and the printed circuit board so that electromagnetic interference within the image capture device is mitigated.

In certain embodiments, the plurality of spaces may be defined between the fins so that contact by a user to the internal heat sink is mitigated or prevented.

In another aspect of the present disclosure, a heat sink assembly is disclosed that includes: an external heat sink; an internal heat sink; and a buffer. The external heat sink includes a base and fins that extend from the base and which form spaces therebetween. The internal heat sink includes: a first internal surface that is overlayed by the base; an external surface that is positioned at a ventilation location of the fins and which is free of contact with the fins; and a second internal surface that is thermally coupled with one or more heat generating components. The buffer is positioned between the first external surface of the internal heat sink and the base.

In certain embodiments, the buffer may be a housing that encloses the first internal surface and the second internal surface of the internal heat sink and the one or more heat generating components.

In certain embodiments, the second internal surface may be thermally coupled with the one or more heat generating components by one or more thermal interface materials or heat conductors.

In certain embodiments, the heat sink assembly may further include an electromagnetic interference gasket that contacts the second internal surface of the heat sink and which encloses some of the one or more heat generating components between the internal heat sink and a printed circuit board.

In another aspect of the present disclosure, an image capture apparatus is disclosed that includes: a front housing that defines a window; a rear housing that is connected to the front housing to define an internal cavity therebetween; a front ISLA that extends through the front housing; a first heat sink that is connected to an exterior surface of the front housing such that the first heat sink is located exterior to the window with respect to the internal cavity; a rear ISLA that extends through the rear housing; and a second heat sink that is connected to the front housing and which is located interior to the window and within the internal cavity, wherein the first heat sink and the second heat sink are devoid of any direct thermal connection.

In certain embodiments, the front housing and the rear housing may be formed from a non-metallic material, and the first heat sink and the second heat sink may be formed from a metallic material.

In certain embodiments, at least one of the first heat sink and the second heat sink may include a surface finish that is configured to increase the thermal emissivity thereof.

In certain embodiments, the front housing and the first heat sink may be configured as discrete components of the image capture apparatus.

In certain embodiments, the first heat sink may be adhesively bonded to the front housing.

In certain embodiments, the front housing may extend between the first heat sink and the second heat sink to thereby insulate the second heat sink from the first heat sink.

In certain embodiments, the first heat sink may extend across the window to distribute heat along an exterior surface of the front housing.

In certain embodiments, the image capture apparatus may further include an electronics assembly that is connected to second heat sink and which is configured to support operation of the image capture apparatus.

In certain embodiments, the electronics assembly may include a main processor.

In certain embodiments, the electronics assembly may be connected to the second heat sink via a thermal interface material such that heat flows from the electronics assembly to the second heat sink through the thermal interface material to the first heat sink, thereby improving the run time of the image capture apparatus.

In another aspect of the present disclosure, an image capture apparatus is disclosed that includes: a front housing; a rear housing that is connected to the front housing; a first heat sink that is connected to the front housing; and a second heat sink that is connected to the front housing such that the front housing separates the first heat sink and the second heat sink to define an air gap therebetween.

In certain embodiments, the first heat sink may be located externally of the image capture apparatus, and the second heat sink may be located internally within the image capture apparatus.

In certain embodiments, the air gap may separate the first heat sink and the second heat sink to moderate heat transfer therebetween.

In certain embodiments, the image capture apparatus may further include an electronics assembly that is connected to second heat sink and which is configured to support operation of the image capture apparatus.

In certain embodiments, the first heat sink may define vents configured to facilitate air flow through the first heat sink and the front housing, whereby the second heat sink is exposed to ambient air to increase heat dissipation from the electronics assembly.

In another aspect of the present disclosure, an image capture apparatus is disclosed that includes: a housing assembly that defines a window; an external heat sink that is supported by the housing assembly; and an internal heat sink that is supported by the housing assembly, wherein the external heat sink and the internal heat sink are positioned on opposite sides of the window, and whereby heat flows from the internal heat sink through the window to the external heat sink for distribution across an exterior surface of the housing assembly.

In certain embodiments, the external heat sink may overlie the window.

In certain embodiments, the housing assembly may include a front housing and a rear housing that is connected to the front housing, wherein the front housing defines the window and extends between the internal heat sink and the external heat sink such that the front housing insulates the external heat sink from the internal heat sink to moderate heat transfer therebetween.

In certain embodiments, the housing assembly, the external heat sink, and the internal heat sink may be configured as discrete components of the image capture apparatus.

In certain embodiments, the external heat sink may be adhesively bonded to the housing assembly, and the internal heat sink may be mechanically connected to the housing assembly via at least one mechanical fastener.

BRIEF DESCRIPTION OF THE DRAWINGS

The present disclosure is best understood from the following detailed description when read in conjunction with the accompanying drawings. According to common practice, the various features of the drawings may not be to-scale, and the dimensions of the various features may be arbitrarily expanded or reduced. Additionally, in the interest of clarity, certain components, elements, and/or features may be omitted from certain drawings in the interest of clarity.

DETAILED DESCRIPTION

Figure 1A:
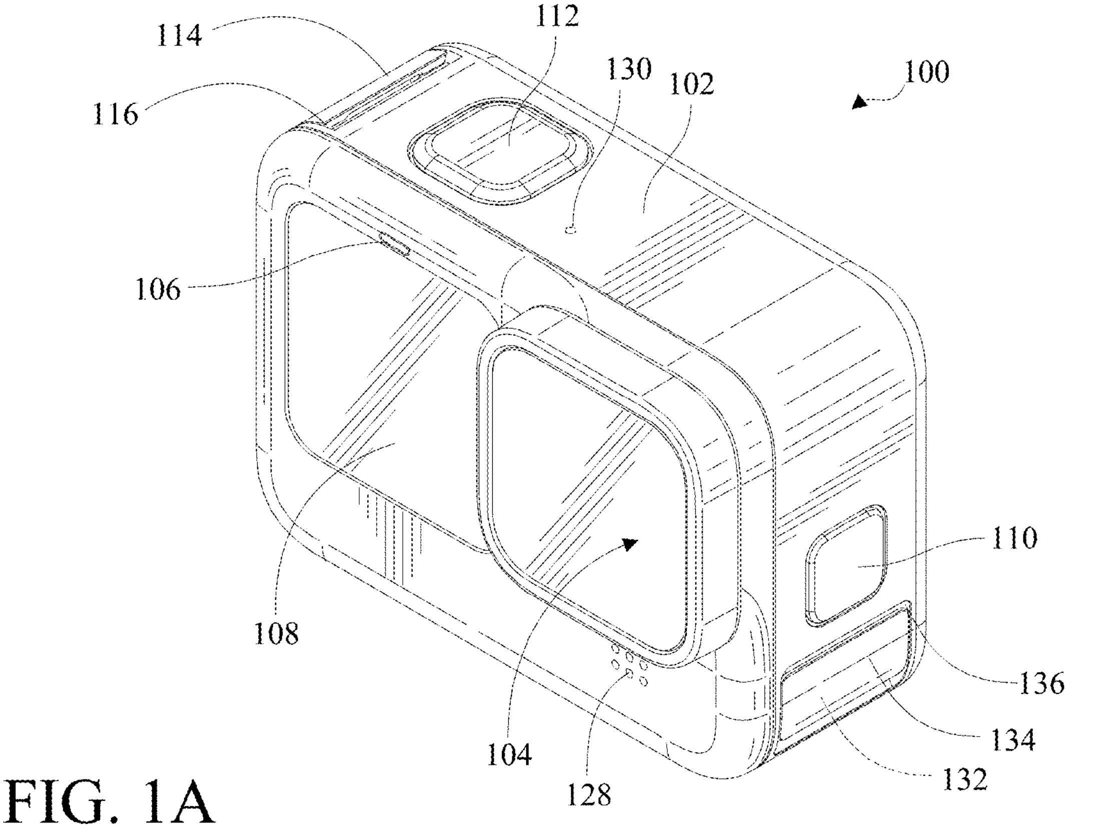
FIGS. 1A-1B are isometric views of an example of an image capture apparatus.

In one aspect, the present disclosure describes an image capture apparatus including internal and external heat sinks that are configured to dissipate thermal energy from one or more internal heat generating components. The external heat sink is connected with an exterior surface of a housing, and the internal heat sink separates an internal surface of the housing and the external heat sink from the one or more heat generating components so that the internal and external heat sinks are not in thermal contact. The external heat sink and the housing define a receptacle that is watertight and allows for a surface of the internal heat sink to be exposed to an external environment. By having the housing physically between the internal and the external heat sinks, the external heat sink can absorb some heat, due to fluid flow and convection, and the internal heat sink can have direct exposure to the external environment, which generally has a lower temperature than the one or more heat generating components. Since the internal heat sink and the housing have a waterproof connection therebetween, the exposure of the internal heat sink to underwater or severe weather (i.e., rain, snow, wind) conditions allows for improved thermal management from direct exposure to the external environment.

Additionally, or alternatively, the external heat sink includes fins that define spaces therebetween, and the configuration of the fins, which are free of thermal contact with the internal heat sink, form a ventilation location that allows and/or improves fluid flow between the internal and external heat sinks so that the internal heat sink can dissipate additional thermal energy to the external heat sink without direct contact with the external heat sink.

The fins extend from a base of the external heat sink and away from the exposed external surface of the internal heat sink, and the fins and/or the base are positioned over the internal heat sink and the housing such that the fins dissipate thermal energy toward portions of the base that are in contact with the housing so that the housing can function as a buffer between portions of the internal and external heat sinks. Relative to the housing, the fins and/or the base are positioned within a receptacle of the housing so that thermal energy is dissipated and a temperature of the external heat sink is kept below a desirable threshold. This configuration is beneficial to mitigate elevated temperature levels on an exterior of the image capture device where a user may touch with his or her hand.

In another aspect, the present disclosure describes an image capture apparatus that includes a housing assembly with front and rear housings; an external heat sink; and an internal heat sink. The external and internal heat sinks are connected to the front housing and are positioned (located) on opposite sides of a window extending therethrough. The front housing thus separates the external and internal heat sinks and defines an air gap therebetween. This separation insulates the external and internal heat sinks from each other to remove any direct thermal connection therebetween. The absence of any direct thermal connection between the external and internal heat sinks allows, but moderates (inhibits), heat flow from the internal heat sink to the external heat sink (i.e., through the window in the front housing) which prevents the exterior temperature of the housing assembly from exceeding a predetermined threshold.

Figure 1B:
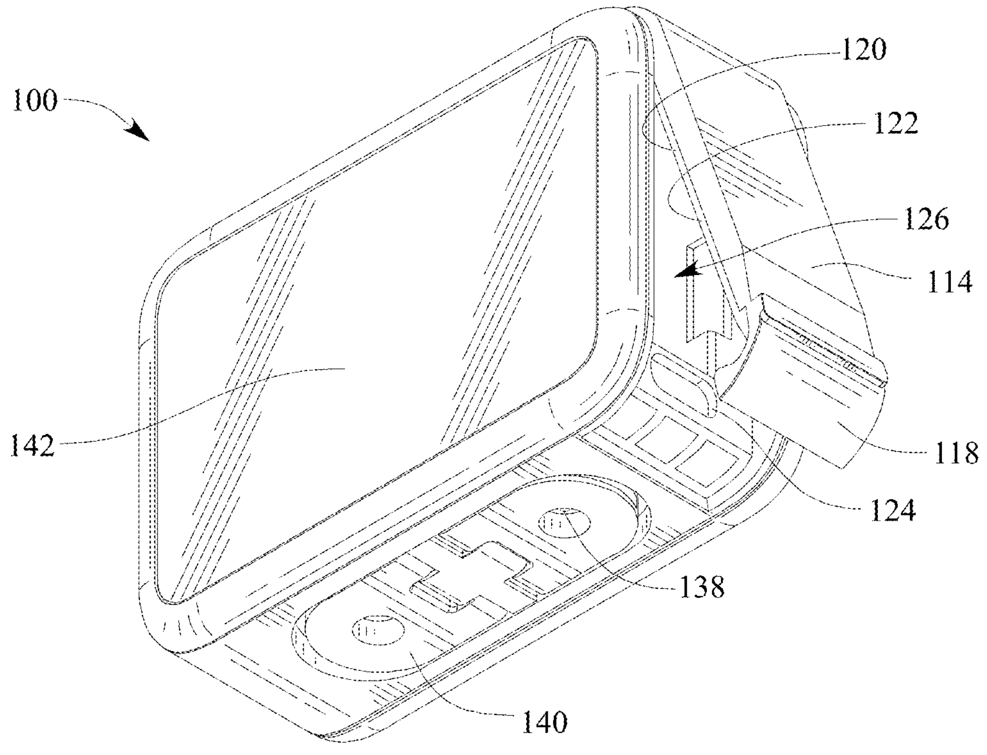

FIGS. 1A-1B are isometric views of an example of an image capture apparatus 100. The image capture apparatus 100 includes a body 102, an image capture device 104, an indicator 106, a display 108, a mode button 110, a shutter button 112, a door 114, a hinge mechanism 116, a latch mechanism 118, a seal 120, a battery interface 122, a data interface 124, a battery receptacle 126, microphones 128, 130, 132, a speaker 138, an interconnect mechanism 140, and a display 142. Although not expressly shown in FIGS.

Figure 5:
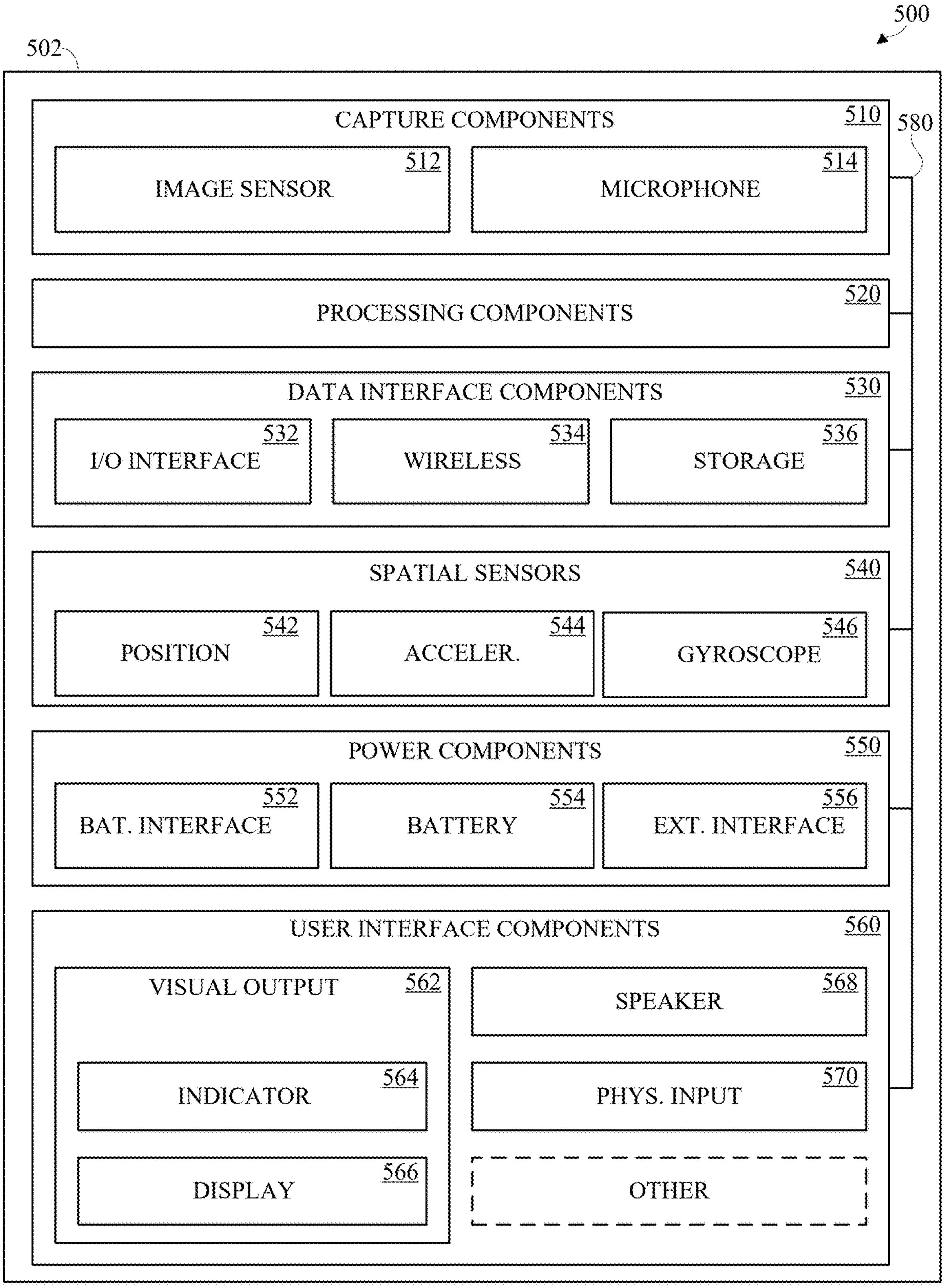
FIG. 5 is a block diagram of electronic components of an image capture apparatus.

1A-1B, the image capture apparatus 100 includes internal electronics, such as imaging electronics, power electronics, and the like, internal to the body 102 for capturing images and performing other functions of the image capture apparatus 100. An example showing internal electronics is shown in FIG. 5. The arrangement of the components of the image capture apparatus 100 shown in FIGS. 1A-1B is an example, other arrangements of elements may be used, except as is described herein or as is otherwise clear from context.

The body 102 of the image capture apparatus 100 may be made of a rigid material such as plastic, aluminum, steel, or fiberglass. Other materials may be used. The image capture device 104 is structured on a front surface of, and within, the body 102. The image capture device 104 includes a lens. The lens of the image capture device 104 receives light incident upon the lens of the image capture device 104 and directs the received light onto an image sensor of the image capture device 104 internal to the body 102. The image capture apparatus 100 may capture one or more images, such as a sequence of images, such as video. The image capture apparatus 100 may store the captured images and video for subsequent display, playback, or transfer to an external device. Although one image capture device 104 is shown in FIG. 1A, the image capture apparatus 100 may include multiple image capture devices, which may be structured on respective surfaces of the body 102.

As shown in FIG. 1A, the image capture apparatus 100 includes the indicator 106 structured on the front surface of the body 102. The indicator 106 may output, or emit, visible light, such as to indicate a status of the image capture apparatus 100. For example, the indicator 106 may be a light-emitting diode (LED). Although one indicator 106 is shown in FIG. 1A, the image capture apparatus 100 may include multiple indictors structured on respective surfaces of the body 102.

As shown in FIG. 1A, the image capture apparatus 100 includes the display 108 structured on the front surface of the body 102. The display 108 outputs, such as presents or displays, such as by emitting visible light, information, such as to show image information such as image previews, live video capture, or status information such as battery life, camera mode, elapsed time, and the like. In some implementations, the display 108 may be an interactive display, which may receive, detect, or capture input, such as user input representing user interaction with the image capture apparatus 100. In some implementations, the display 108 may be omitted or combined with another component of the image capture apparatus 100.

As shown in FIG. 1A, the image capture apparatus 100 includes the mode button 110 structured on a side surface of the body 102. Although described as a button, the mode button 110 may be another type of input device, such as a switch, a toggle, a slider, or a dial. Although one mode button 110 is shown in FIG. 1A, the image capture apparatus 100 may include multiple mode, or configuration, buttons structured on respective surfaces of the body 102. In some implementations, the mode button 110 may be omitted or combined with another component of the image capture apparatus 100. For example, the display 108 may be an interactive, such as touchscreen, display, and the mode button 110 may be physically omitted and functionally combined with the display 108.

As shown in FIG. 1A, the image capture apparatus 100 includes the shutter button 112 structured on a top surface of the body 102. The shutter button 112 may be another type of input device, such as a switch, a toggle, a slider, or a dial. The image capture apparatus 100 may include multiple shutter buttons structured on respective surfaces of the body 102. In some implementations, the shutter button 112 may be omitted or combined with another component of the image capture apparatus 100.

The mode button 110, the shutter button 112, or both, obtain input data, such as user input data in accordance with user interaction with the image capture apparatus 100. For example, the mode button 110, the shutter button 112, or both, may be used to turn the image capture apparatus 100 on and off, scroll through modes and settings, and select modes and change settings.

As shown in FIG. 1B, the image capture apparatus 100 includes the door 114 coupled to the body 102, such as using the hinge mechanism 116 (FIG. 1A). The door 114 may be connected (secured) to the body 102 using the latch mechanism 118 that releasably engages the body 102 at a position generally opposite the hinge mechanism 116. The door 114 includes the seal 120 and the battery interface 122. Although one door 114 is shown in FIG. 1A, the image capture apparatus 100 may include multiple doors respectively forming respective surfaces of the body 102, or portions thereof. The door 114 may be removable from the body 102 by releasing the latch mechanism 118 from the body 102 and decoupling the hinge mechanism 116 from the body 102.

In FIG. 1B, the door 114 is shown in a partially open position such that the data interface 124 is accessible for communicating with external devices and the battery receptacle 126 is accessible for placement or replacement of a battery. In FIG. 1A, the door 114 is shown in a closed position. In implementations in which the door 114 is in the closed position, the seal 120 engages a flange (not shown) to provide an environmental seal and the battery interface 122 engages the battery (not shown) to secure the battery in the battery receptacle 126.

As shown in FIG. 1B, the image capture apparatus 100 includes the battery receptacle 126 structured to form a portion of an interior surface of the body 102. The battery receptacle 126 includes operative connections for power transfer between the battery and the image capture apparatus 100. In some implementations, the battery receptacle 126 may be omitted. The image capture apparatus 100 may include multiple battery receptacles.

As shown in FIG. 1A, the image capture apparatus 100 includes a first microphone 128 structured on a front surface of the body 102, a second microphone 130 structured on a top surface of the body 102, and a third microphone 132 structured on a side surface of the body 102. The third microphone 132, which may be referred to as a drain microphone and is indicated as hidden in dotted line, is positioned (located) behind a drain cover 134, surrounded by a drain channel 136, and can drain liquid from audio components of the image capture apparatus 100. The image capture apparatus 100 may include other microphones on other surfaces of the body 102. The microphones 128, 130, 132 receive and record audio, such as in conjunction with capturing video or separate from capturing video. In some implementations, one or more of the microphones 128, 130, 132 may be omitted or combined with other components of the image capture apparatus 100.

As shown in FIG. 1B, the image capture apparatus 100 includes the speaker 138 structured on a bottom surface of the body 102. The speaker 138 outputs or presents audio, such as by playing back recorded audio or emitting sounds associated with notifications. The image capture apparatus 100 may include multiple speakers structured on respective surfaces of the body 102.

As shown in FIG. 1B, the image capture apparatus 100 includes the interconnect mechanism 140 structured on a bottom surface of the body 102. The interconnect mechanism 140 removably connects (secures) the image capture apparatus 100 to an external structure, such as a handle grip, another mount, or a securing device. The interconnect mechanism 140 includes folding protrusions configured to move between a nested or collapsed position as shown in FIG. 1B and an extended or open position. The folding protrusions of the interconnect mechanism 140 in the extended or open position may be coupled to reciprocal protrusions of other devices such as handle grips, mounts, clips, or like devices. The image capture apparatus 100 may include multiple interconnect mechanisms structured on, or forming a portion of, respective surfaces of the body 102. In some implementations, the interconnect mechanism 140 may be omitted.

As shown in FIG. 1B, the image capture apparatus 100 includes the display 142 structured on, and forming a portion of, a rear surface of the body 102. The display 142 outputs, such as presents or displays, such as by emitting visible light, data, such as to show image information such as image previews, live video capture, or status information such as battery life, camera mode, elapsed time, and the like. In some implementations, the display 142 may be an interactive display, which may receive, detect, or capture input, such as user input representing user interaction with the image capture apparatus 100. The image capture apparatus 100 may include multiple displays structured on respective surfaces of the body 102, such as the displays 108, 142 shown in FIGS. 1A-1B. In some implementations, the display 142 may be omitted or combined with another component of the image capture apparatus 100.

The image capture apparatus 100 may include features or components other than those described herein, such as other buttons or interface features. In some implementations, interchangeable lenses, cold shoes, and hot shoes, or a combination thereof, may be coupled to or combined with the image capture apparatus 100. For example, the image capture apparatus 100 may communicate with an external device, such as an external user interface device, via a wired or wireless computing communication link, such as via the data interface 124. The computing communication link may be a direct computing communication link or an indirect computing communication link, such as a link including another device or a network, such as the Internet. The image capture apparatus 100 may transmit images to the external device via the computing communication link.

The external device may store, process, display, or combination thereof, the images. The external user interface device may be a computing device, such as a smartphone, a tablet computer, a smart watch, a portable computer, personal computing device, or another device or combination of devices configured to receive user input, communicate information with the image capture apparatus 100 via the computing communication link, or receive user input and communicate information with the image capture apparatus 100 via the computing communication link. The external user interface device may implement or execute one or more applications to manage or control the image capture apparatus 100. For example, the external user interface device may include an application for controlling camera configuration, video acquisition, video display, or any other configurable or controllable aspect of the image capture apparatus 100. In some implementations, the external user interface device may generate and share, such as via a cloud-based or social media service, one or more images or video clips. In some implementations, the external user interface device may display unprocessed or minimally processed images or video captured by the image capture apparatus 100 contemporaneously with capturing the images or video by the image capture apparatus 100, such as for shot framing or live preview.

Figure 2A:
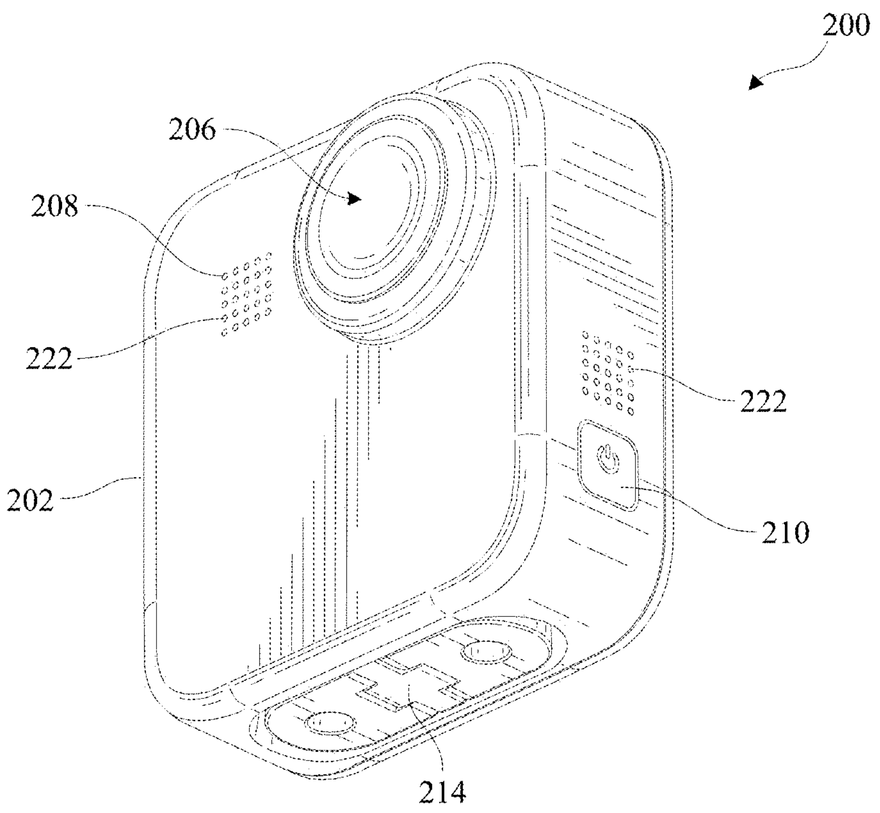
FIGS. 2A-2B are isometric views of another example of an image capture apparatus.
Figure 2B:
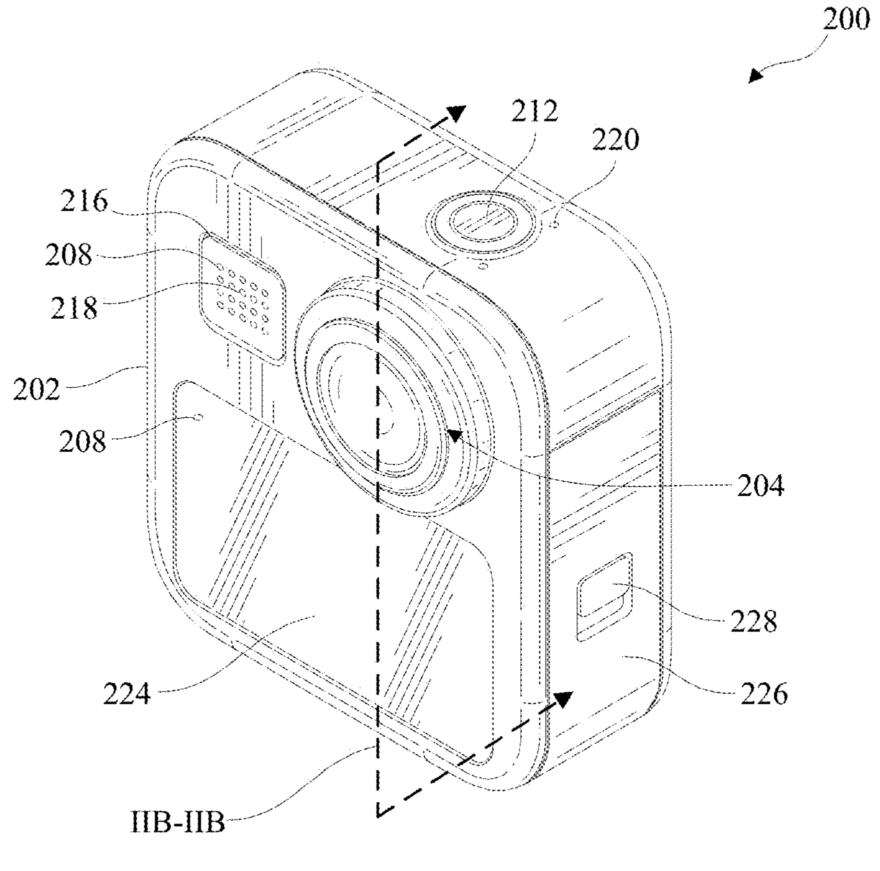

FIGS. 2A-2B illustrate another example of an image capture apparatus 200. The image capture apparatus 200 is similar to the image capture apparatus 100 shown in FIGS. 1A-1B. The image capture apparatus 200 includes a body 202, a first image capture device 204, a second image capture device 206, indicators 208, a mode button 210, a shutter button 212, an interconnect mechanism 214, a drainage channel 216, audio components 218, 220, 222, a display 224, and a door 226 including a release mechanism 228. The arrangement of the components of the image capture apparatus 200 shown in FIGS. 2A-2B is an example, other arrangements of elements may be used.

The body 202 of the image capture apparatus 200 may be similar to the body 102 shown in FIGS. 1A-1B. The first image capture device 204 is structured on a front surface of the body 202. The first image capture device 204 includes a first lens. The first image capture device 204 may be similar to the image capture device 104 shown in FIG. 1A. As shown in FIG. 2A, the image capture apparatus 200 includes the second image capture device 206 structured on a rear surface of the body 202. The second image capture device 206 includes a second lens. The second image capture device 206 may be similar to the image capture device 104 shown in FIG. 1A. The image capture devices 204, 206 are disposed on opposing surfaces of the body 202, for example, in a back-to-back configuration, Janus configuration, or offset Janus configuration. The image capture apparatus 200 may include other image capture devices structured on respective surfaces of the body 202.

As shown in FIG. 2B, the image capture apparatus 200 includes the indicators 208 associated with the audio component 218 and the display 224 on the front surface of the body 202. The indicators 208 may be similar to the indicator 106 shown in FIG. 1A. For example, one of the indicators 208 may indicate a status of the first image capture device 204 and another one of the indicators 208 may indicate a status of the second image capture device 206. Although two indicators 208 are shown in FIGS. 2A-2B, the image capture apparatus 200 may include other indictors structured on respective surfaces of the body 202.

As shown in FIGS. 2A-B, the image capture apparatus 200 includes input mechanisms including the mode button 210, structured on a side surface of the body 202, and the shutter button 212, structured on a top surface of the body 202. The mode button 210 may be similar to the mode button 110 shown in FIG. 1B. The shutter button 212 may be similar to the shutter button 112 shown in FIG. 1A.

The image capture apparatus 200 includes internal electronics (not expressly shown), such as imaging electronics, power electronics, and the like, internal to the body 202 for capturing images and performing other functions of the image capture apparatus 200. An example showing internal electronics is shown in FIG. 5.

As shown in FIGS. 2A-2B, the image capture apparatus 200 includes the interconnect mechanism 214 structured on a bottom surface of the body 202. The interconnect mechanism 214 may be similar to the interconnect mechanism 140 shown in FIG. 1B.

As shown in FIG. 2B, the image capture apparatus 200 includes the drainage channel 216 for draining liquid from audio components of the image capture apparatus 200.

As shown in FIGS. 2A-2B, the image capture apparatus 200 includes the audio components 218, 220, 222, respectively structured on respective surfaces of the body 202. The audio components 218, 220, 222 may be similar to the microphones 128, 130, 132 and the speaker 138 shown in FIGS. 1A-1B. One or more of the audio components 218, 220, 222 may be, or may include, audio sensors, such as microphones, to receive and record audio signals, such as voice commands or other audio, in conjunction with capturing images or video. One or more of the audio components 218, 220, 222 may be, or may include, an audio presentation component that may present, or play, audio, such as to provide notifications or alerts.

As shown in FIGS. 2A-2B, a first audio component 218 is positioned (located) on a front surface of the body 202, a second audio component 220 is positioned (located) on a top surface of the body 202, and a third audio component 222 is positioned (located) on a back surface of the body 202. Other numbers and configurations for the audio components 218, 220, 222 may be used. For example, the audio component 218 may be a drain microphone surrounded by the drainage channel 216 and adjacent to one of the indicators 208 as shown in FIG. 2B.

As shown in FIG. 2B, the image capture apparatus 200 includes the display 224 structured on a front surface of the body 202. The display 224 may be similar to the displays 108, 142 shown in FIGS. 1A-1B. The display 224 may include an I/O interface. The display 224 may include one or more of the indicators 208. The display 224 may receive touch inputs. The display 224 may display image information during video capture. The display 224 may provide status information to a user, such as status information indicating battery power level, memory card capacity, time elapsed for a recorded video, etc. The image capture apparatus 200 may include multiple displays structured on respective surfaces of the body 202. In some implementations, the display 224 may be omitted or combined with another component of the image capture apparatus 200.

As shown in FIG. 2B, the image capture apparatus 200 includes the door 226 structured on, or forming a portion of, the side surface of the body 202. The door 226 may be similar to the door 114 shown in FIG. 1A. For example, the door 226 shown in FIG. 2A includes a release mechanism 228. The release mechanism 228 may include a latch, a button, or other mechanism configured to receive a user input that allows the door 226 to change position. The release mechanism 228 may be used to open the door 226 for a user to access a battery, a battery receptacle, an I/O interface, a memory card interface, etc.

In some embodiments, the image capture apparatus 200 may include features or components other than those described herein, some features or components described herein may be omitted, or some features or components described herein may be combined. For example, the image capture apparatus 200 may include additional interfaces or different interface features, interchangeable lenses, cold shoes, or hot shoes.

Figure 3:
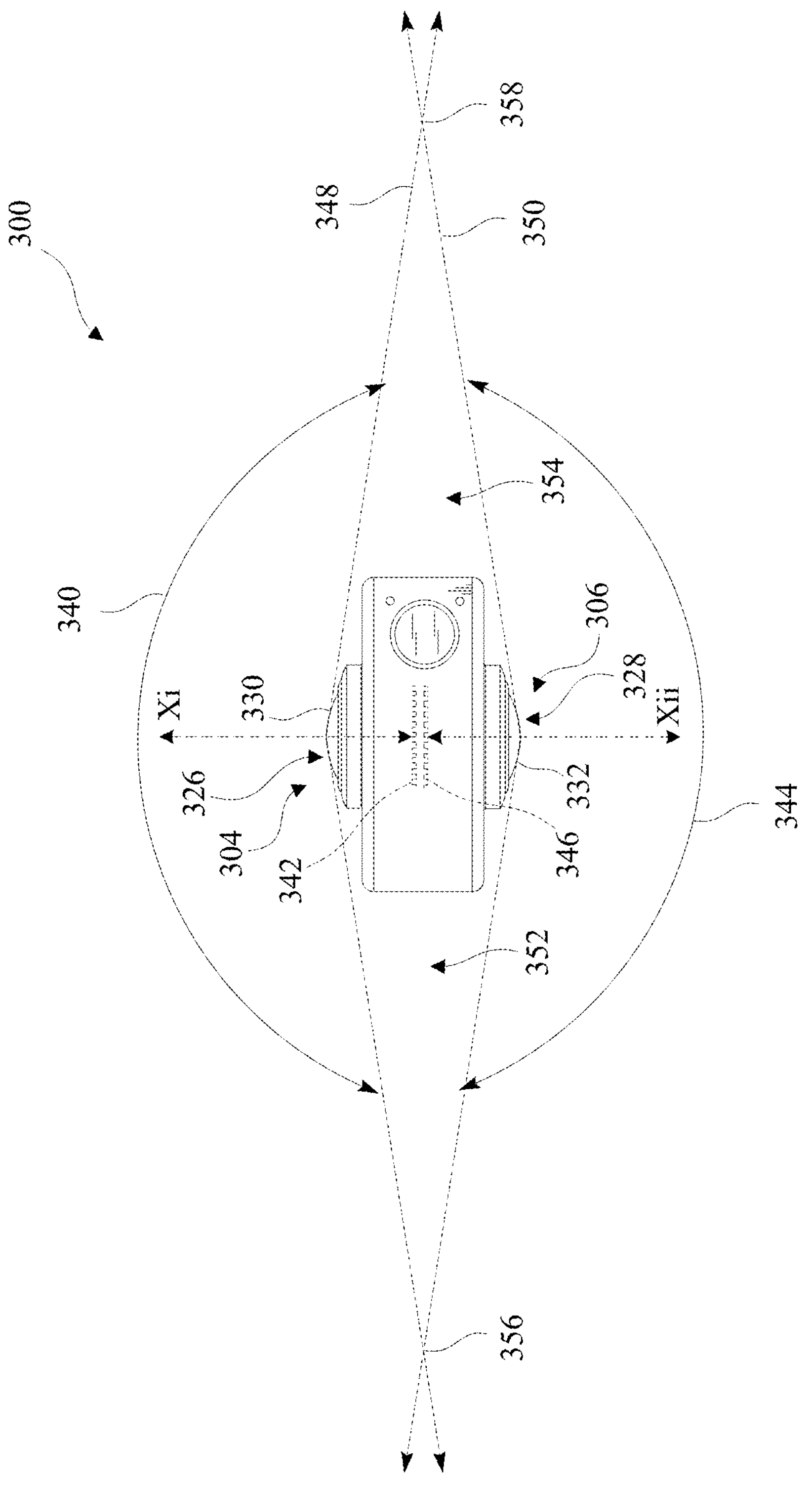
FIG. 3 is a top view of another example of an image capture apparatus.

FIG. 3 is a top view of an image capture apparatus 300. The image capture apparatus 300 is similar to the image capture apparatus 200 of FIGS. 2A-2B and is configured to capture spherical images.

As shown in FIG. 3, a first image capture device 304 includes a first lens 330 and a second image capture device 306 includes a second lens 332. For example, the first image capture device 304 may capture a first image, such as a first hemispheric, or hyper-hemispherical, image, the second image capture device 306 may capture a second image, such as a second hemispheric, or hyper-hemispherical, image, and the image capture apparatus 300 may generate a spherical image incorporating or combining the first image and the second image, which may be captured concurrently, or substantially concurrently.

The first image capture device 304 defines a first field-of-view 340 wherein the first lens 330 of the first image capture device 304 receives light. The first lens 330 directs the received light corresponding to the first field-of-view 340 onto a first image sensor 342 of the first image capture device 304. For example, the first image capture device 304 may include a first lens barrel (not expressly shown), extending from the first lens 330 to the first image sensor 342. In the illustrated embodiment, the first lens 330 and the first image sensor 342 are integrated into a single unit, whereby the first image capture device 304 is configured as a first ISLA 326 that defines a first optical axis Xi.

The second image capture device 306 defines a second field-of-view 344 wherein the second lens 332 receives light. The second lens 332 directs the received light corresponding to the second field-of-view 344 onto a second image sensor 346 of the second image capture device 306. For example, the second image capture device 306 may include a second lens barrel (not expressly shown), extending from the second lens 332 to the second image sensor 346. In the illustrated embodiment, the second lens 332 and the second image sensor 346 are integrated into a single unit, whereby the second image capture device 306 is configured as a second ISLA 328 that defines a second optical axis Xii.

A boundary 348 of the first field-of-view 340 is shown using broken directional lines. A boundary 350 of the second field-of-view 344 is shown using broken directional lines. As shown, the image capture devices 304, 306 are arranged in a back-to-back (Janus) configuration such that the lenses 330, 332 face in opposite directions (e.g., a forward direction and a rearward direction), and such that the image capture apparatus 300 may capture spherical images. The first image sensor 342 captures a first hyper-hemispherical image plane from light entering the first lens 330. The second image sensor 346 captures a second hyper-hemispherical image plane from light entering the second lens 332.

As shown in FIG. 3, the fields-of-view 340, 344 partially overlap such that the combination of the fields-of-view 340, 344 forms a spherical field-of-view, except that one or more uncaptured areas 352, 354 may be outside of the fields-of-view 340, 344 of the lenses 330, 332. Light emanating from or passing through the uncaptured areas 352, 354, which may be proximal to the image capture apparatus 300, may be obscured from the lenses 330, 332 and the corresponding image sensors 342, 346, such that content corresponding to the uncaptured areas 352, 354 may be omitted from images captured by the image capture apparatus 300. In some implementations, the image capture devices 304, 306, or the lenses 330, 332 thereof, may be configured to minimize the uncaptured areas 352, 354.

Examples of points of transition, or overlap points, from the uncaptured areas 352, 354 to the overlapping portions of the fields-of-view 340, 344 are shown at 356, 358.

Images contemporaneously captured by the respective image sensors 342, 346 may be combined to form a combined image, such as a spherical image. Generating a combined image may include correlating the overlapping regions captured by the respective image sensors 342, 346, aligning the captured fields-of-view 340, 344, and stitching the images together to form a cohesive combined image. Stitching the images together may include correlating the overlap points 356, 358 with respective locations in corresponding images captured by the image sensors 342, 346. Although a planar view of the fields-of-view 340, 344 is shown in FIG. 3, the fields-of-view 340, 344 are hyper-hemispherical.

A change in the alignment, such as position, tilt, or a combination thereof, of the image capture devices 304, 306, such as of the lenses 330, 332, the image sensors 342, 346, or both, may change the relative positions of the respective fields-of-view 340, 344, may change the locations of the overlap points 356, 358, such as with respect to images captured by the image sensors 342, 346, and may change the uncaptured areas 352, 354, which may include changing the uncaptured areas 352, 354 unequally.

Incomplete or inaccurate information indicating the alignment of the image capture devices 304, 306, such as the locations of the overlap points 356, 358, may decrease the accuracy, efficiency, or both of generating a combined image. In some implementations, the image capture apparatus 300 may maintain information indicating the location and orientation of the image capture devices 304, 306, such as of the lenses 330, 332, the image sensors 342, 346, or both, such that the fields-of-view 340, 344, the overlap points 356, 358, or both may be accurately determined, which may improve the accuracy, efficiency, or both of generating a combined image.

The ISLAs 326, 328 (e.g., the lenses 330, 332) may be aligned as shown (e.g., such that the optical axes Xi, Xii are coincident with each other), laterally offset from each other (not shown), off-center from a central axis of the image capture apparatus 300 (not shown), or laterally offset and off-center from the central axis (not shown). Whether through use of offset or through use of compact image capture devices 304, 306, a reduction in distance between the lenses 330, 332 may improve the overlap in the fields-of-view 340, 344, such as by reducing the uncaptured areas 352, 354.

Images or frames captured by the image capture devices 304, 306 may be combined, merged, or stitched together to produce a combined image, such as a spherical or panoramic image, which may be an equirectangular planar image. In some implementations, generating a combined image may include use of techniques such as noise reduction, tone mapping, white balancing, or other image correction. In some implementations, pixels along a stitch boundary, which may correspond with the overlap points 356, 358, may be matched accurately to minimize boundary discontinuities.

Figure 4A:
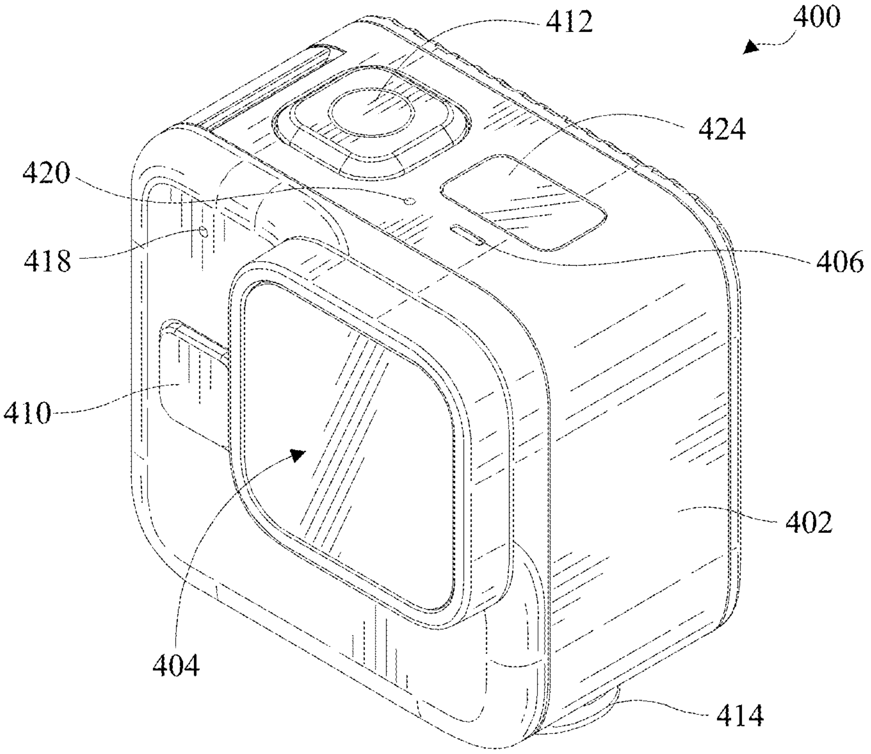
FIGS. 4A-4B are isometric views of another example of an image capture apparatus.
Figure 4B:
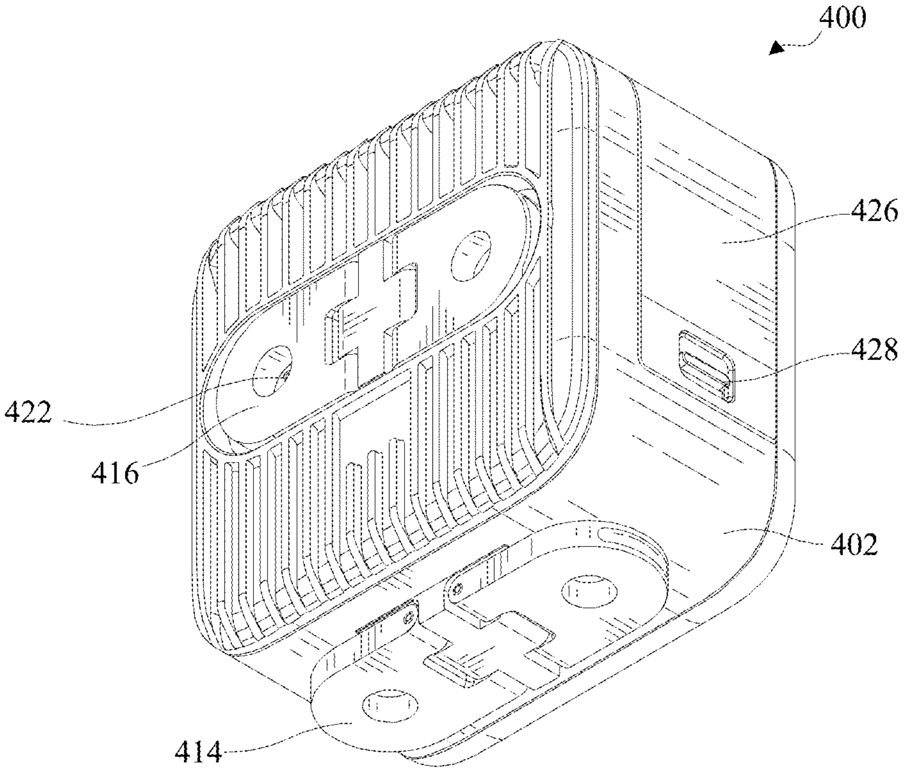

FIGS. 4A-4B illustrate another example of an image capture apparatus 400. The image capture apparatus 400 is similar to the image capture apparatus 100 shown in FIGS. 1A-1B and to the image capture apparatus 200 shown in FIGS. 2A-2B. The image capture apparatus 400 includes a body 402, an image capture device 404, an indicator 406, a mode button 410, a shutter button 412, interconnect mechanisms 414, 416, audio components 418, 420, 422, a display 424, and a door 426 including a release mechanism 428. The arrangement of the components of the image capture apparatus 400 shown in FIGS. 4A-4B is an example, other arrangements of elements may be used.

The body 402 of the image capture apparatus 400 may be similar to the body 102 shown in FIGS. 1A-1B. The image capture device 404 is structured on a front surface of the body 402. The image capture device 404 includes a lens and may be similar to the image capture device 104 shown in FIG. 1A.

As shown in FIG. 4A, the image capture apparatus 400 includes the indicator 406 on a top surface of the body 402. The indicator 406 may be similar to the indicator 106 shown in FIG. 1A. The indicator 406 may indicate a status of the image capture device 204. Although one indicator 406 is shown in FIG. 4A, the image capture apparatus 400 may include other indictors structured on respective surfaces of the body 402.

As shown in FIG. 4A, the image capture apparatus 400 includes input mechanisms including the mode button 410, structured on a front surface of the body 402, and the shutter button 412, structured on a top surface of the body 402. The mode button 410 may be similar to the mode button 110 shown in FIG. 1B. The shutter button 412 may be similar to the shutter button 112 shown in FIG. 1A.

The image capture apparatus 400 includes internal electronics (not expressly shown), such as imaging electronics, power electronics, and the like, internal to the body 402 for capturing images and performing other functions of the image capture apparatus 400. An example showing internal electronics is shown in FIG. 5.

As shown in FIGS. 4A-4B, the image capture apparatus 400 includes the interconnect mechanisms 414, 416, with a first interconnect mechanism 414 structured on a bottom surface of the body 402 and a second interconnect mechanism 416 disposed within a rear surface of the body 402. The interconnect mechanisms 414, 416 may be similar to the interconnect mechanism 140 shown in FIG. 1B and the interconnect mechanism 214 shown in FIG. 2A.

As shown in FIGS. 4A-4B, the image capture apparatus 400 includes the audio components 418, 420, 422 respectively structured on respective surfaces of the body 402. The audio components 418, 420, 422 may be similar to the microphones 128, 130, 132 and the speaker 138 shown in FIGS. 1A-1B. One or more of the audio components 418, 420, 422 may be, or may include, audio sensors, such as microphones, to receive and record audio signals, such as voice commands or other audio, in conjunction with capturing images or video. One or more of the audio components 418, 420, 422 may be, or may include, an audio presentation component that may present, or play, audio, such as to provide notifications or alerts.

As shown in FIGS. 4A-4B, a first audio component 418 is located on a front surface of the body 402, a second audio component 420 is located on a top surface of the body 402, and a third audio component 422 is located on a rear surface of the body 402. Other numbers and configurations for the audio components 418, 420, 422 may be used.

As shown in FIG. 4A, the image capture apparatus 400 includes the display 424 structured on a front surface of the body 402. The display 424 may be similar to the displays 108, 142 shown in FIGS. 1A-1B. The display 424 may include an I/O interface. The display 424 may receive touch inputs. The display 424 may display image information during video capture. The display 424 may provide status information to a user, such as status information indicating battery power level, memory card capacity, time elapsed for a recorded video, etc. The image capture apparatus 400 may include multiple displays structured on respective surfaces of the body 402. In some implementations, the display 424 may be omitted or combined with another component of the image capture apparatus 200.

As shown in FIG. 4B, the image capture apparatus 400 includes the door 426 structured on, or forming a portion of, the side surface of the body 402. The door 426 may be similar to the door 226 shown in FIG. 2B. The door 426 shown in FIG. 4B includes the release mechanism 428. The release mechanism 428 may include a latch, a button, or other mechanism configured to receive a user input that allows the door 426 to change position. The release mechanism 428 may be used to open the door 426 for a user to access a battery, a battery receptacle, an I/O interface, a memory card interface, etc.

In some embodiments, the image capture apparatus 400 may include features or components other than those described herein, some features or components described herein may be omitted, or some features or components described herein may be combined. For example, the image capture apparatus 400 may include additional interfaces or different interface features, interchangeable lenses, cold shoes, or hot shoes.

FIG. 5 is a block diagram of electronic components in an image capture apparatus 500. The image capture apparatus 500 may be a single-lens image capture device, a multi-lens image capture device, or variations thereof, including an image capture apparatus with multiple capabilities such as the use of interchangeable integrated sensor lens assemblies. Components, such as electronic components, of the image capture apparatus 100 shown in FIGS. 1A-1B, the image capture apparatus 200 shown in FIGS. 2A-2B, the image capture apparatus 300 shown in FIG. 3, or the image capture apparatus 400 shown in FIGS. 4A-4B, may be implemented as shown in FIG. 5.

The image capture apparatus 500 includes a body 502. The body 502 may be similar to the body 102 shown in FIGS. 1A-1B, the body 202 shown in FIGS. 2A-2B, or the body 402 shown in FIGS. 4A-4B. The body 502 includes electronic components such as capture components 510, processing components 520, data interface components 530, spatial sensors 540, power components 550, user interface components 560, and a bus 580.

The capture components 510 include an image sensor 512 for capturing images. Although one image sensor 512 is shown in FIG. 5, the capture components 510 may include multiple image sensors. The image sensor 512 may be similar to the image sensors 342, 346 shown in FIG. 3. The image sensor 512 may be, for example, a charge-coupled device (CCD) sensor, an active pixel sensor (APS), a complementary metal-oxide-semiconductor (CMOS) sensor, or an N-type metal-oxide-semiconductor (NMOS) sensor. The image sensor 512 detects light, such as within a defined spectrum, such as the visible light spectrum or the infrared spectrum, incident through a corresponding lens such as the first lens 330 with respect to the first image sensor 342 or the second lens 332 with respect to the second image sensor 346 as shown in FIG. 3. The image sensor 512 captures detected light as image data and conveys the captured image data as electrical signals (image signals or image data) to the other components of the image capture apparatus 500, such as to the processing components 520, such as via the bus 580.

The capture components 510 include a microphone 514 for capturing audio. Although one microphone 514 is shown in FIG. 5, the capture components 510 may include multiple microphones. The microphone 514 detects and captures, or records, sound, such as sound waves incident upon the microphone 514. The microphone 514 may detect, capture, or record sound in conjunction with capturing images by the image sensor 512. The microphone 514 may detect sound to receive audible commands to control the image capture apparatus 500. The microphone 514 may be similar to the microphones 128, 130, 132 shown in FIGS. 1A-1B, the audio components 218, 220, 222 shown in FIGS. 2A-2B, or the audio components 418, 420, 422 shown in FIGS. 4A-4B.

The processing components 520 perform image signal processing, such as filtering, tone mapping, or stitching, to generate, or obtain, processed images, or processed image data, based on image data obtained from the image sensor 512. The processing components 520 may include one or more processors having single or multiple processing cores. In some implementations, the processing components 520 may include, or may be, an application specific integrated circuit (ASIC) or a digital signal processor (DSP). For example, the processing components 520 may include a custom image signal processor. The processing components 520 conveys data, such as processed image data, with other components of the image capture apparatus 500 via the bus 580. In some implementations, the processing components 520 may include an encoder, such as an image or video encoder that may encode, decode, or both, the image data, such as for compression coding, transcoding, or a combination thereof.

Although not shown expressly in FIG. 5, the processing components 520 may include memory, such as a random-access memory (RAM) device, which may be non-transitory computer-readable memory. The memory of the processing components 520 may include executable instructions and data that can be accessed by the processing components 520.

The data interface components 530 communicates with other, such as external, electronic devices, such as a remote control, a smartphone, a tablet computer, a laptop computer, a desktop computer, or an external computer storage device. For example, the data interface components 530 may receive commands to operate the image capture apparatus 500. In another example, the data interface components 530 may transmit image data to transfer the image data to other electronic devices. The data interface components 530 may be configured for wired communication, wireless communication, or both. As shown, the data interface components 530 include an I/O interface 532, a wireless data interface 534, and a storage interface 536. In some implementations, one or more of the I/O interface 532, the wireless data interface 534, or the storage interface 536 may be omitted or combined.

The I/O interface 532 may send, receive, or both, wired electronic communications signals. For example, the I/O interface 532 may be a universal serial bus (USB) interface, such as USB type-C interface, a high-definition multimedia interface (HDMI), a FireWire interface, a digital video interface link, a display port interface link, a Video Electronics Standards Associated (VESA) digital display interface link, an Ethernet link, or a Thunderbolt link. Although one I/O interface 532 is shown in FIG. 5, the data interface components 530 include multiple I/O interfaces. The I/O interface 532 may be similar to the data interface 124 shown in FIG. 1B.

The wireless data interface 534 may send, receive, or both, wireless electronic communications signals. The wireless data interface 534 may be a Bluetooth interface, a ZigBee interface, a Wi-Fi interface, an infrared link, a cellular link, a near field communications (NFC) link, or an Advanced Network Technology interoperability (ANT+) link. Although one wireless data interface 534 is shown in FIG. 5, the data interface components 530 include multiple wireless data interfaces. The wireless data interface 534 may be similar to the data interface 124 shown in FIG. 1B.

The storage interface 536 may include a memory card connector, such as a memory card receptacle, configured to receive and operatively couple to a removable storage device, such as a memory card, and to transfer, such as read, write, or both, data between the image capture apparatus 500 and the memory card, such as for storing images, recorded audio, or both captured by the image capture apparatus 500 on the memory card. Although one storage interface 536 is shown in FIG. 5, the data interface components 530 include multiple storage interfaces. The storage interface 536 may be similar to the data interface 124 shown in FIG. 1B.

The spatial, or spatiotemporal, sensors 540 detect the spatial position, movement, or both, of the image capture apparatus 500. As shown in FIG. 5, the spatial sensors 540 include a position sensor 542, an accelerometer 544, and a gyroscope 546. The position sensor 542, which may be a global positioning system (GPS) sensor, may determine a geospatial position of the image capture apparatus 500, which may include obtaining, such as by receiving, temporal data, such as via a GPS signal. The accelerometer 544, which may be a three-axis accelerometer, may measure linear motion, linear acceleration, or both of the image capture apparatus 500. The gyroscope 546, which may be a three-axis gyroscope, may measure rotational motion, such as a rate of rotation, of the image capture apparatus 500. In some implementations, the spatial sensors 540 may include other types of spatial sensors. In some implementations, one or more of the position sensor 542, the accelerometer 544, and the gyroscope 546 may be omitted or combined.

The power components 550 distribute electrical power to the components of the image capture apparatus 500 for operating the image capture apparatus 500. As shown in FIG. 5, the power components 550 include a battery interface 552, a battery 554, and an external power interface 556 (ext. interface). The battery interface 552 (bat. interface) operatively couples to the battery 554, such as via conductive contacts to transfer power from the battery 554 to the other electronic components of the image capture apparatus 500. The battery interface 552 may be similar to the battery receptacle 126 shown in FIG. 1B. The external power interface 556 obtains or receives power from an external source, such as a wall plug or external battery, and distributes the power to the components of the image capture apparatus 500, which may include distributing power to the battery 554 via the battery interface 552 to charge the battery 554. Although one battery interface 552, one battery 554, and one external power interface 556 are shown in FIG. 5, any number of battery interfaces, batteries, and external power interfaces may be used. In some implementations, one or more of the battery interface 552, the battery 554, and the external power interface 556 may be omitted or combined. For example, in some implementations, the external interface 556 and the I/O interface 532 may be combined.

The user interface components 560 receive input, such as user input, from a user of the image capture apparatus 500, output, such as display or present, information to a user, or both receive input and output information, such as in accordance with user interaction with the image capture apparatus 500.

As shown in FIG. 5, the user interface components 560 include visual output components 562 to visually communicate information, such as to present captured images. As shown, the visual output components 562 include an indicator 564 and a display 566. The indicator 564 may be similar to the indicator 106 shown in FIG. 1A, the indicators 208 shown in FIGS. 2A-2B, or the indicator 406 shown in FIG. 4A. The display 566 may be similar to the display 108 shown in FIG. 1A, the display 142 shown in FIG. 1B, the display 224 shown in FIG. 2B, or the display 424 shown in FIG. 4A. Although the visual output components 562 are shown in FIG. 5 as including one indicator 564, the visual output components 562 may include multiple indicators. Although the visual output components 562 are shown in FIG. 5 as including one display 566, the visual output components 562 may include multiple displays. In some implementations, one or more of the indicator 564 or the display 566 may be omitted or combined.

As shown in FIG. 5, the user interface components 560 include a speaker 568. The speaker 568 may be similar to the speaker 138 shown in FIG. 1B, the audio components 218, 220, 222 shown in FIGS. 2A-2B, or the audio components 418, 420, 422 shown in FIGS. 4A-4B. Although one speaker 568 is shown in FIG. 5, the user interface components 560 may include multiple speakers. In some implementations, the speaker 568 may be omitted or combined with another component of the image capture apparatus 500, such as the microphone 514.

As shown in FIG. 5, the user interface components 560 include a physical input interface 570. The physical input interface 570 may be similar to the mode buttons 110, 210, 410 shown in FIGS. 1A, 2A, and 4A or the shutter buttons 112, 212, 412 shown in FIGS. 1A, 2B, and 4A. Although one physical input interface 570 is shown in FIG. 5, the user interface components 560 may include multiple physical input interfaces. In some implementations, the physical input interface 570 may be omitted or combined with another component of the image capture apparatus 500. The physical input interface 570 may be, for example, a button, a toggle, a switch, a dial, or a slider.

As shown in FIG. 5, the user interface components 560 include a broken line border box labeled "other" to indicate that components of the image capture apparatus 500 other than the components expressly shown as included in the user interface components 560 may be user interface components. For example, the microphone 514 may receive, or capture, and process audio signals to obtain input data, such as user input data corresponding to voice commands. In another example, the image sensor 512 may receive, or capture, and process image data to obtain input data, such as user input data corresponding to visible gesture commands. In another example, one or more of the spatial sensors 540, such as a combination of the accelerometer 544 and the gyroscope 546, may receive, or capture, and process motion data to obtain input data, such as user input data corresponding to motion gesture commands.

Figure 6A:
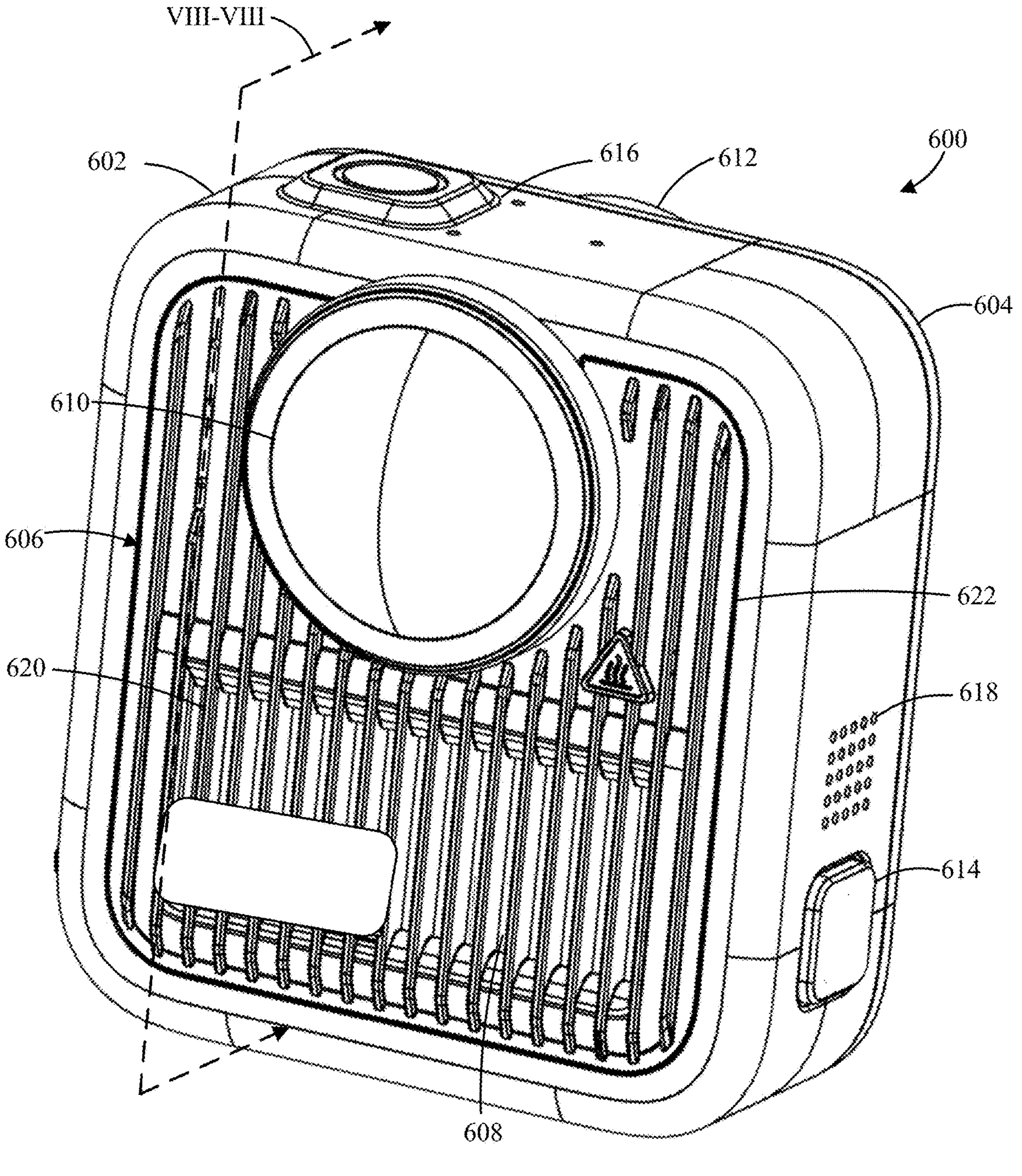
FIGS. 6A-6B are perspective views of an image capture apparatus.
Figure 6B:
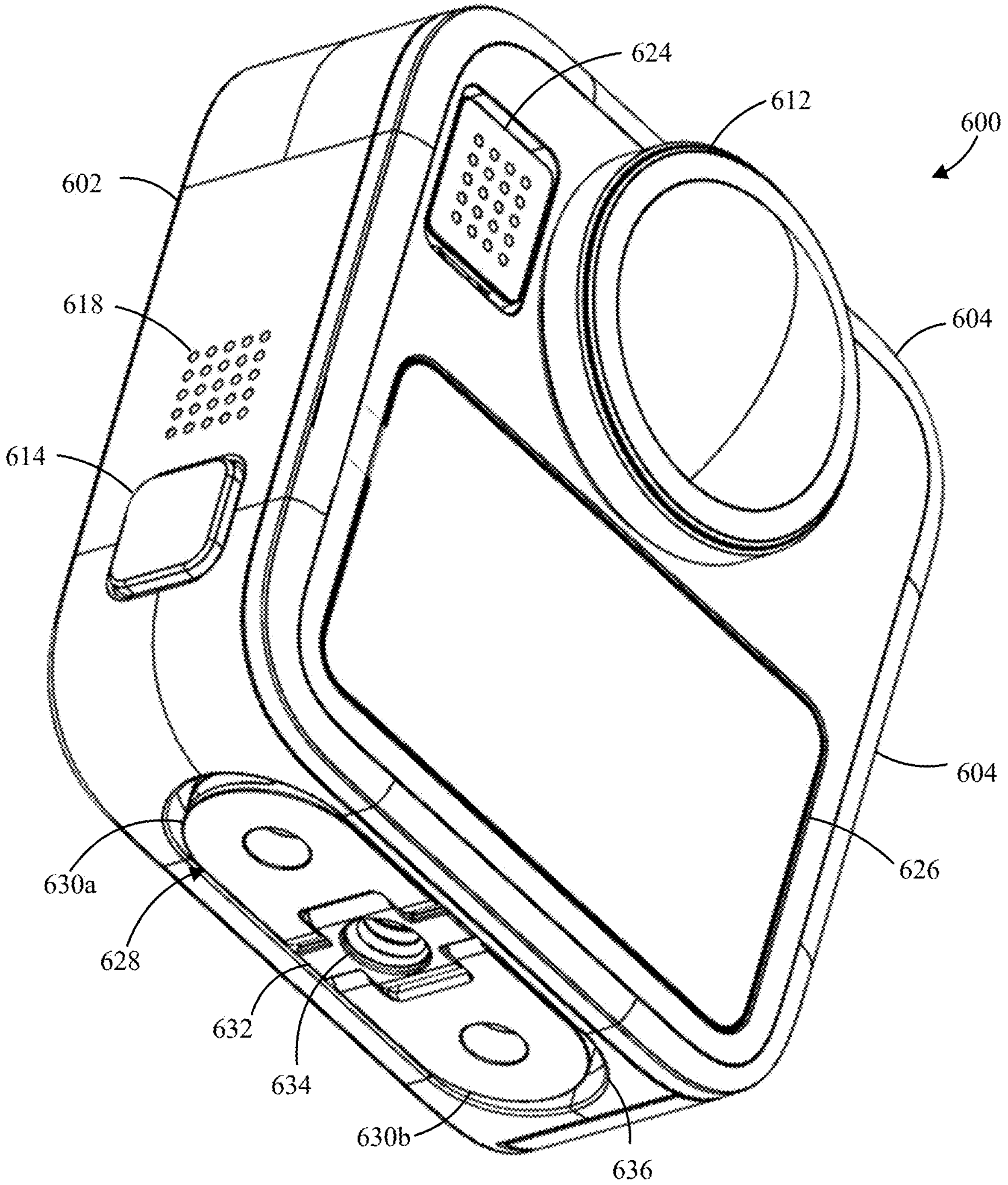

FIGS. 6A-6B are perspective views of an image capture apparatus 600. The image capture apparatus 600 may be similar to the image capture apparatuses 100, 200, 300, 400, 500 of FIGS. 1A-5. The image capture apparatus 600 includes front and rear housings 602, 604 that enclose internal components. The front housing 602 is connected with an external heat sink 606 that is configured to dissipate thermal energy from an internal heat sink 608, and between the front housing 602 and the external heat sink 606, a front lens barrel 610 extends from the front housing 902 and is opposite of a rear lens barrel 612 that extends though the rear housing 604. The front and rear lens barrels 610, 612 may be optically aligned along an optical axis (not shown) that extends through the front and rear housings 602, 604. The front and rear lens barrels 610, 612 each comprise a lens, are configured to allow light to reach internal image sensors (see, e.g., the image sensors 914, 916 of FIGS. 9B), and may be similar to the lenses 330, 332 of FIG. 3. The front housing 602 includes buttons 614, 616 configured to control one or more features of the image capture apparatus 600, such as detecting images, powering on/off, adjusting volume, etc., and audio apertures 618 configured to project audio waves to or from one or more audio components (not shown).

The external heat sink 606 includes fins 620 that are free of contact with each other and the internal heat sink 608 and configured to dissipate thermal energy, and the fins 620 extend between portions of a base 622 and are arranged over the internal heat sink 608 such that the internal heat sink 608 is exposed to an external environment. The fins 620 extend over the internal heat sink 608 towards the base 622 at external portions of the front housing 602 so that thermal energy is dissipated to the fins 620 by convection and/or fluid flow and towards the external portions of the front housing 602. The base 622 may be flush with surfaces of the front housing 602 so that higher temperature portions of the external heat sink 606 are not extending beyond surfaces of the front housing 602. The rear housing 604 includes an audio assembly 624 configured to project and/or receive audio waves and overlay one or more audio components. The rear housing 604 includes a display 626, which may be similar to the displays 142, 224 of FIGS. 1A-2B, for interacting with software features and/or viewing captured images.

At a bottommost surface of the front housing 602, a mounting apparatus 628 is positioned to connect with one or more external accessories (not shown) so that a user can utilize the image capture apparatus 600 without directly grasping the image capture apparatus 600. This may be advantageous to avoid contacting the external heat sink and/or for using the image capture apparatus in severe weather or underwater conditions to improve fluid flow between the fins 620 and to the internal heat sink 608. The mounting apparatus 628 includes a pair of fingers 630*a*, 630*b* that are rotatable about the mounting support 632 between a use position (not shown, where the fingers are rotated out) and a stored position (see, e.g., FIG. 6B). The mounting support 632 connects with the front housing 602 at a mounting aperture 634, which may optionally include a fastener (not shown, see e.g., fastener 830 of FIG. 8A). The mounting aperture 634 may include the fastener to dissipate thermal energy from the internal heat sink 608 to the fingers 630*a*, 630*b* in addition to the external heat sink 606. The mounting apparatus 628 is positioned within a repository 636 of the front housing 602 so that when in the stored position, the mounting apparatus 628 is flush with external surfaces of the front housing 602 and out of the way during use of the image capture apparatus 600.

Figure 6C:
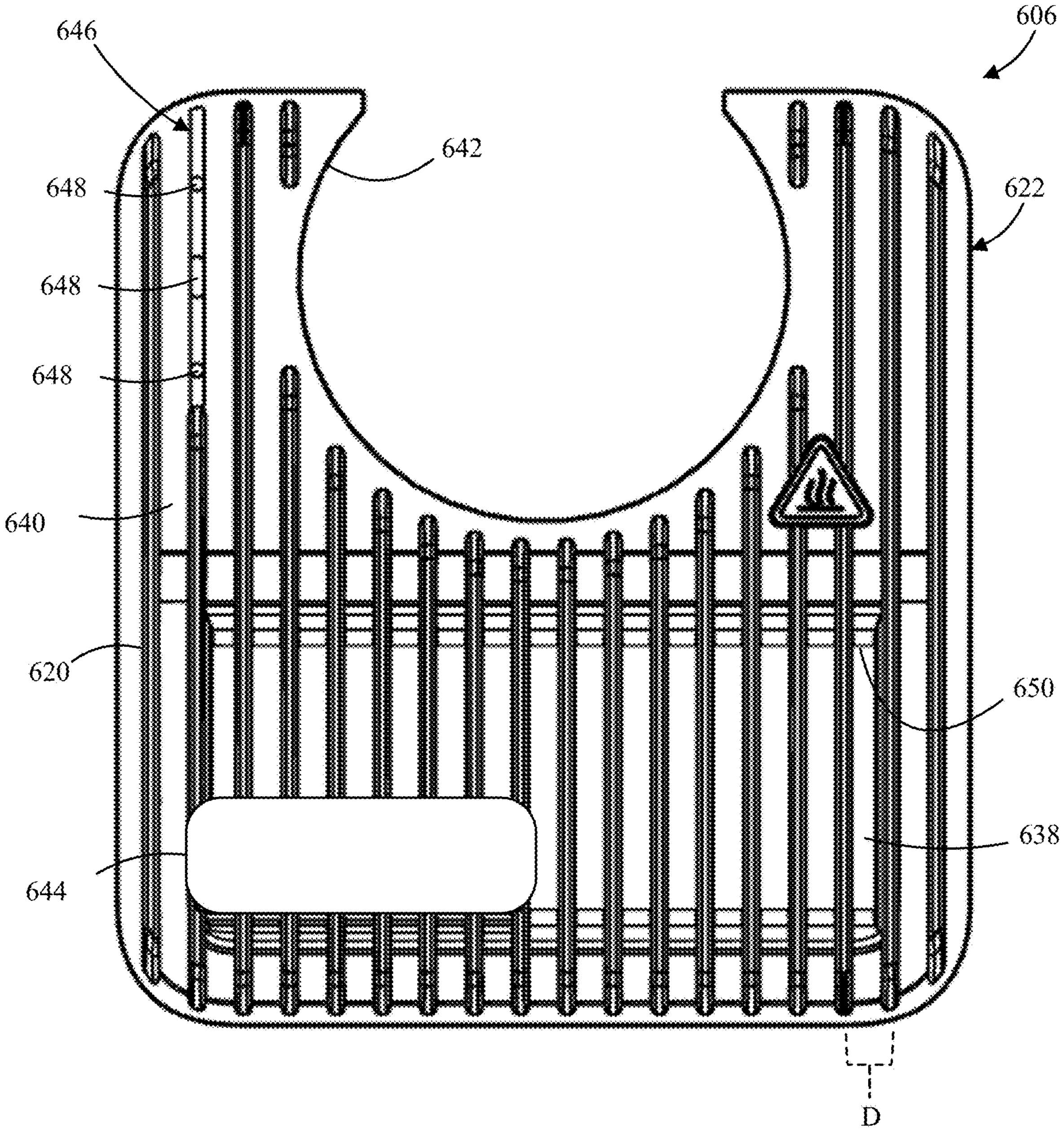
FIG. 6C is a front view of the external heat sink.
Figure 6D:
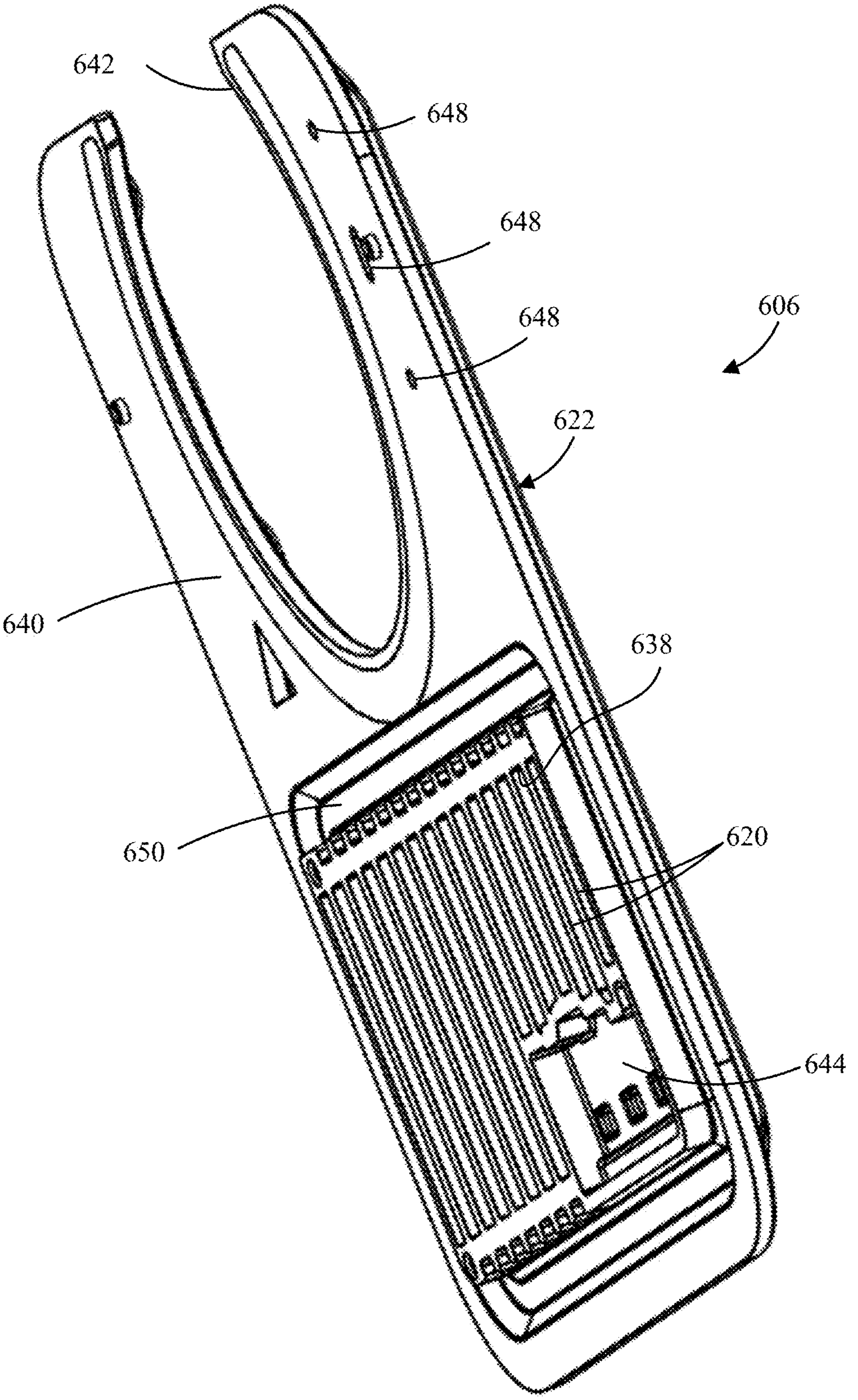
FIG. 6D is a perspective view of the external heat sink.

FIG. 6C is a front view of the external heat sink 606 of the image capture apparatus 600 of FIG. 6A. FIG. 6D is a perspective view of the external heat sink 606 of the image capture apparatus 600 of FIG. 6A. The base 622 and the fins 620 of the external heat sink 606 define one or more spaces 638 that are configured to allow fluids to move in and out of contact with the internal heat sink (see, e.g., the internal heat sink 608 of FIGS. 6A-6B) so that thermal energy can be dissipated from the internal heat sink to the fins 620 and/or an external environment. The fins 620 function to dissipate thermal energy from the internal heat sink (e.g., the internal heat sink 608 of FIGS. 6A-6B) to the base 622 so that overheating of the internal heat sink or other internal components is avoided. Two of the fins 620 may be spaced by a distance D to form the one or more spaces 638. The distance D may be any distance sufficient to allow desirable fluid flow through the one or more spaces 638 and between the fins 620 such that the internal heat sink is desirably cooled. The distance D may be chosen based on a desired amount or rate of fluid flow to the one or more spaces 638. The distance D may be chosen such that fingers of a user cannot inadvertently contact the internal heat sink (not shown) during operation of the image capture apparatus 600. For example, the distance D may be about 0.5 mm to about 30 mm. The external heat sink 606 may include any number of the fins 620 sufficient to improve thermal energy dissipation from the internal heat sink. The external heat sink 606 may include a number of the fins 620 sufficient to define the one or more spaces 638 in an arrangement that does not allow the fingers of the user contact the internal heat sink. For example, the external heat sink 606 may include between two and forty of the fins 620.

At a top of the base 622, a cooling portion 640 is included to receive thermal energy from the fins 620. The cooling portion 640 functions to receive thermal energy from the internal heat sink (e.g., the internal heat sink 608 of FIGS. 6A-6B) through the fins 620 and dissipate the thermal energy onto a surface of the front housing (e.g., the front housing 602 of FIGS. 6A-6B) so that the internal components of the image capture apparatus 600 do not overheat. The cooling portion 640 may additionally receive thermal energy through one or more image sensors (e.g., the image sensors 914, 916 of FIG. 9B) that are associated with one of the lens barrels (e.g., the front and rear lens barrels 610, 612 of FIGS. 6A-6B). For example, the image sensors may transfer thermal energy to the external heat sink 606 through an external heat sink lens receptacle 642. In some examples, the lenses and/or image sensor are thermally insulated from the external heat sink 606 through the front housing so that the external heat sink 606 can primarily function to dissipate thermal energy from the internal heat sink without being raised above a threshold temperature.

The external heat sink lens receptacle 642 may function to allow integration of one or more lens barrels (e.g., the front and/or rear lens barrels 610, 612 of FIGS. 6A-6B) within the external heat sink 606 so that the external heat sink 606 has a larger surface area on the front housing and is capable of dissipating more thermal energy. Having the larger surface area may be advantageous where significant thermal energy is dissipated from the internal heat sink (e.g., the internal heat sink 608 of FIGS. 6A-6B) through the fins 620 and operation is extended due to the ability of the external heat sink 606 to dissipate more thermal energy through the larger surface area.

Additionally, inclusion of the external heat sink lens receptacle 642 allows for the external heat sink 606 to essentially or completely cover a facial surface of the front housing (e.g., the front housing 602 of FIGS. 6A-6B) and improve the functionality of the external heat sink 606. The external heat sink lens receptacle 642 is shown as having a "U" or horseshoe shape so that the lens barrel (e.g., the front lens barrel 610 of FIGS. 6A-6B) having a larger size is useable on the image capture apparatus 600. In other examples, the external heat sink lens receptacle 642 may have a shape of an oval, circle, square, rectangle, triangle, or any other closed or partially open shape so that the external heat sink 606 encloses sides of the lens barrels to improve thermal energy dissipation from the fins 620 and/or base 622.

Overlaying or adject to the fins 620, the base 622 includes a platform 644 configured to display a logo or dissipate heat. The platform 644 has a flat surface at a front of the external heat sink 606 (see, e.g., FIG. 6C) for displaying the logo or dissipating thermal energy and a cutout at a rear surface of the external heat sink (see, e.g., FIG. 6D) for improving fluid flow during operation of the image capture apparatus 600. In some examples, the platform 644 extends horizontally or vertically over some, about half or more, or all of the fins 620 depending on the size of the cutout or the logo presented. In some examples, the platform 644 extends over surfaces of the base 622 to avoid reducing a size of the fins 620 and/or the one or more spaces 638. In some examples, the platform 644 is not included in the external heat sink 606.

The base 622 further includes an audio slot 646 that includes audio apertures 648 so that audio signals may be received within or projected through the external heat sink 606. The base 622 may include any number of audio slots 646 and/or audio apertures 648 desirable to achieve adequate audio signal reception and/or projection during operation of the image capture apparatus 600. For example, between one and four of the audio slots 646 may be included. For example, between one and twelve audio apertures 648 may be included. The audio slots 646 replaces a portion of the fins 620 on the base 622 (see, e.g., FIGS. 6A and 6C) so that portions of the base 622 separate the fins 620. In some examples, the audio slots 646 may be integrated in the portions of the base 622 between two of the fins 620 so that substantially all of the fins 620 can extend from a topmost to a bottommost surface of the external heat sink 606 without interruption of the audio slots 646.

Positioned around and at least partially defining the one or more spaces 638, an external heat sink gasket 650 functions to connect and/or form a watertight seal with the front housing (e.g., the front housing 602 of FIGS. 6A-6B) and/or the internal heat sink (e.g., the internal heat sink 608 of FIGS. 6A-6B). At a rear side of the external heat sink 606, the external heat sink gasket 650 may have any depth measured from a front to a rear of the external heat sink 606 sufficient to connect with the front housing and/or the internal heat sink. The external heat sink gasket 650 has a shape of a closed loop that completely encloses the one or more spaces 638 so that fluids are configured to flow between the fins 620 and through the one or more spaces 638 and the fluids do not enter an inside of the image capture apparatus 600. The external heat sink gasket 650 may have any shape sufficient to form a closed loop, such as a circle, a square, a rectangle, a triangle, an oval, or any combination thereof. In some examples, the external heat sink gasket 650 extends from a bottommost surface of the external heat sink lens receptacle 642 to a bottommost surface of the base 622 to maximize the area defining the spaces 638.

The external heat sink 606 functions to dissipate thermal energy from other components, such as heat generating components and/or the internal heat sink 608. The external heat sink 606 may be positioned on or contacted with one or more external surfaces of the front housing 602, rear housing 604, and/or internal heat sink 608 such that during operation of the image capture apparatus 600, the external heat sink 606 is kept below a temperature threshold. The temperature threshold may be a temperature chosen to mitigate or prevent damage to part or a hand/finger of the user during operation of the image capture apparatus 600. More than one of the external heat sinks 606 may be included on the front and/or rear housings 602, 604, such as between one and six of the external heat sinks 606 that are separate from each other (i.e., spaced a distance apart).

The external heat sink 606 may extend over any external surface of the image capture apparatus 600 such that a receptacle, space, or opening is formed to allow external exposure of an internal heat sink (e.g., the internal heat sink 608 of FIG. 6A). For example, the external heat sink 606 may be positioned on portions of both the front and rear housings 602, 604. The external heat sink 606 may extend over two or more surfaces, such as by being positioned on one surface that extends across a corner to another surface. The external heat sink 606 may be partially or fully integrated with an external wall of image capture apparatus 600 such that at least one portion of the external heat sink 606 is exposed to an external environment outside of the image capture apparatus 600.

The external heat sink 606 may be composed of any material sufficient to efficiently dissipate thermal energy from an internal heat sink (e.g., the internal heat sink 608 of FIG. 6A) without directly contacting the internal heat sink. For example, the external heat sink 606 may include a ceramic, graphite, conductive polymer, metal, metal alloy, or combinations thereof configured to direct thermal energy through the fins 620 to one or more portions of the base 622. The external heat sink 606 may include metals or metal alloys of aluminum, copper, or both. The external heat sink 606 may include a similar or different material than one or more of the internal heat sinks.

Figure 6E:
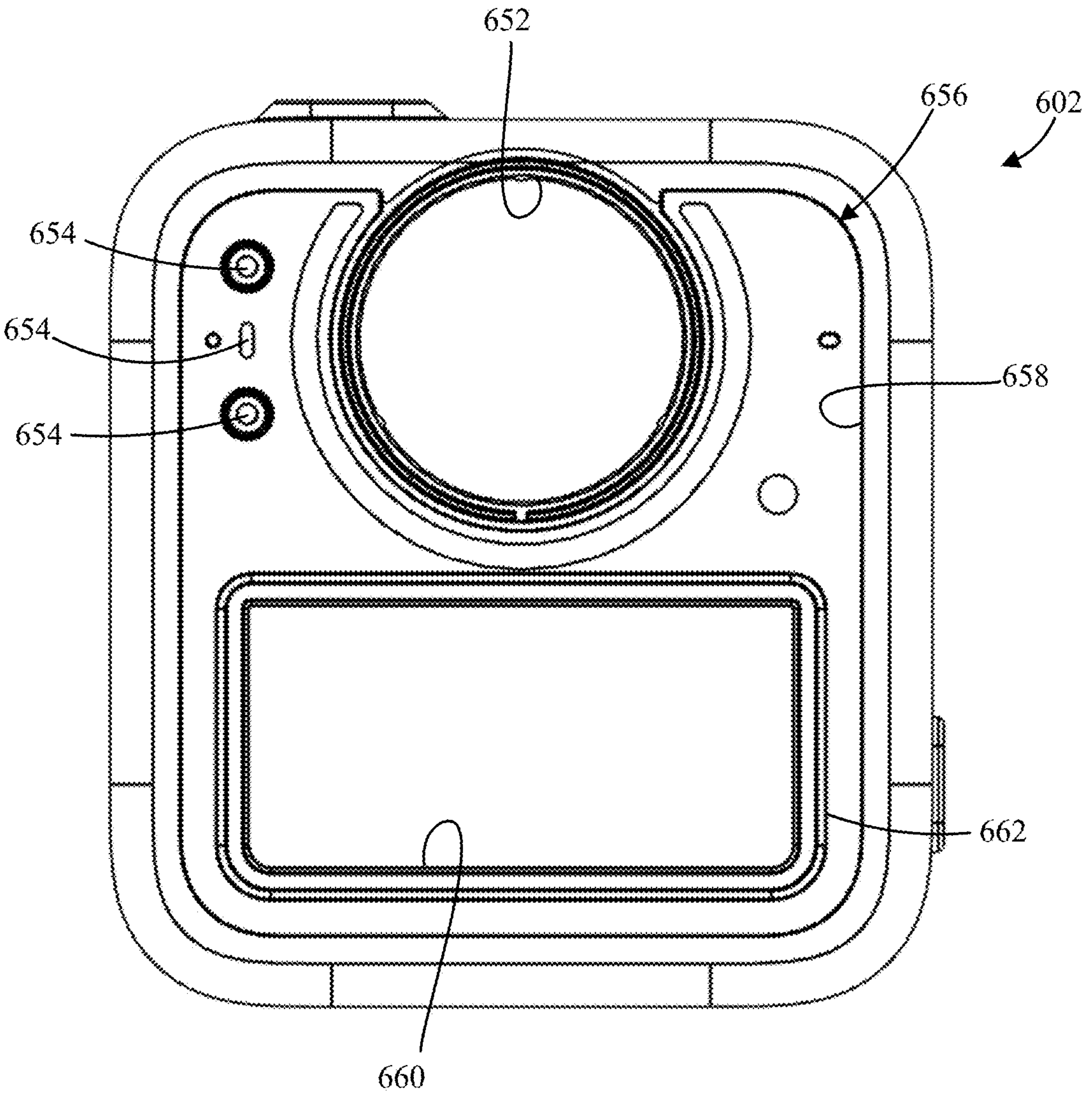
FIG. 6E is a front view of the front housing.

FIG. 6E is a front view of the front housing 602 of the image capture apparatus 600 of FIG. 6A. The front housing 602 includes a front housing lens receptacle 652 that is configured to allow for a lens barrel (see, e.g., the front lens barrel 610 of FIGS. 6A-6B) to extend through the front housing 602. The front housing lens receptacle 652 has a shape of a closed loop so that a watertight seal is formable around the lens barrel and fluids do not undesirably enter the image capture apparatus 600. The front housing lens receptacle 652 may form a watertight seal with the lens barrel by using fasteners and/or adhesive to secure the lens barrel to the front housing lens receptacle 652.

The front housing 602 includes audio apertures 654 that are configured to align with the audio apertures 648 of FIG. 6C to form an audio pathway to and from audio components (see, e.g., the audio components 670 of FIGS. 6F) within the image capture apparatus 600. The audio apertures 654 may additionally be configured to form a thermal pathway, such as through conductors, fasteners, or thermal interface materials, between the audio components and the external heat sink 606. The front housing 602 may include any number of audio apertures 654 sufficient to allow audio signals to travel through the audio apertures 648 of FIG. 6C. The front housing 602 may have a number of audio apertures 654 that is equal to, less, than, or greater than the audio apertures 648 of FIG. 6C.

For integration of an external heat sink (see, e.g., the external heat sink 606 of FIGS. 6A and 6C-6D), the front housing 602 includes a wall 656 that defines an external heat sink receptacle 658. The wall 656 is positioned to have a height extending from the external surface of the front housing 602 such that the wall 656 is flush with the external housing, which may be advantageous to avoid the external heat sink from extending beyond the wall 656 and undesirably interacting with a finger or hand of a person. The wall 656 may have any closed loop shape that substantially conforms with a shape of the external heat sink and/or a lens barrel (see, e.g., the front lens barrel 610 of FIG. 6A).

At a location of an internal heat sink (see, e.g., the internal heat sink 608 of FIG. 6A) and within the wall 656, the front housing 602 includes a front housing receptacle 660 defined by a front housing gasket 662. The front housing receptacle 660 functions to allow for fluids to pass between fins (see, e.g., the fins 620 of FIGS. 6A and 6C-6D) and contact the internal heat sink so that thermal energy may be dissipated. The front housing receptacle 660 and/or front housing gasket 662 may be shaped or arranged to integrate or align with a portion of the internal heat sink and/or an external heat sink gasket (see, e.g., the external heat sink gasket 650 of FIG. 6C-6D) and form a watertight seal such that fluids do not contaminate an inside of the image capture apparatus 600. Between either of the internal heat sink or the external heat sink, a thermally insulative or conductive adhesive may be applied at the front housing gasket 662 to control dissipation of thermal energy and/or to improve water sealability.

Figure 6F:
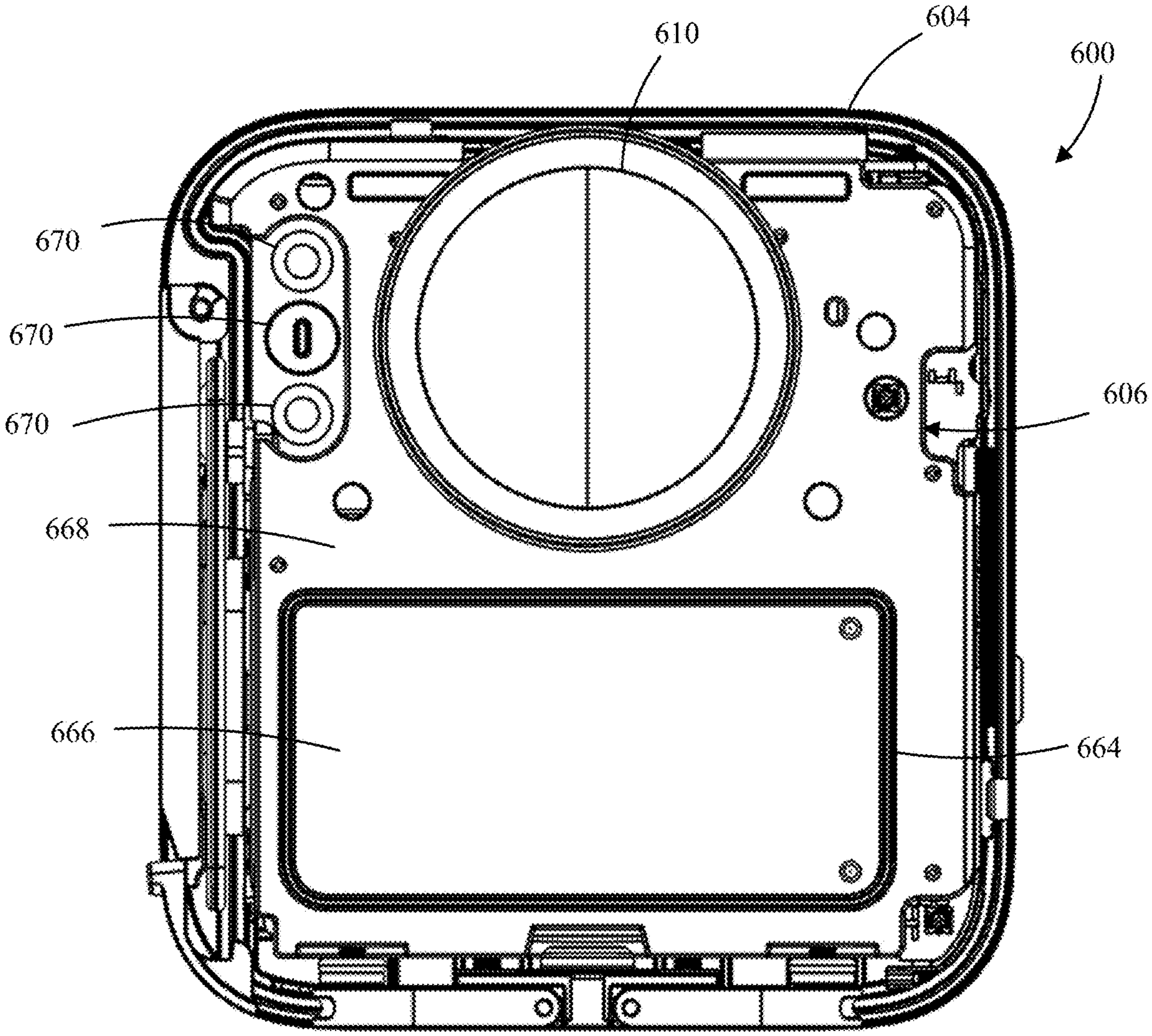
FIG. 6F is a front view of the image capture apparatus without the front housing and the external heat sink.

FIG. 6F is a front view of the image capture apparatus 600 illustrating the internal heat sink 608 without the front housing 602 of FIGS. 6A-6B and 6E and the external heat sink 606 of FIGS. 6A and 6C-6D. The internal heat sink 608 includes an internal heat sink mount 664 that is integrate-able and/or align-able with an external heat sink gasket (see, e.g., the external heat sink gasket 650 of FIGS. 6C-6D) and/or a front housing gasket (see, e.g., front housing gasket 662 of FIG. 6E) so that a watertight seal is formed between the external heat sink, the front housing, and/or the internal heat sink 608. The internal heat sink mount 664 additionally functions to the separate the external and internal surfaces 666, 668 of the internal heat sink 608 so that thermal energy dissipation is controlled between the internal heat sink 608 and the external heat sink. Since the internal heat sink mount 664 provides a barrier between the external and internal surfaces 666, 668, thermal energy is directed to the external surface 666, which is exposed to cool fluids (meaning fluids of a temperature lower than a temperature of the internal heat sink 608) of an external environment. With this configuration, the internal heat sink 608 has a thermal pathway to the external environment that extends run (operation) time by dissipating thermal energy to a cool fluid or medium without allowing undesirable fluids to enter an inside of the image capture apparatus 600.

The internal surfaces 668 may refer to any surface that is internal of the image capture apparatus 600 and physically separated from ab external environment and/or an external heat sink (see, e.g., the external heat sink 606 of FIGS. 6A and 6C-6D). A front housing (see, e.g., the front housing 602 of FIGS. 6A-6B and 6E) may function as a buffer or insulator between one of the internal surfaces 668 (e.g., a front internal surface) of the internal heat sink 608 and the external heat sink so that the external heat sink does not attain a temperature above a threshold. For example, the front housing functioning as a buffer or insulator may keep a temperature of the external housing from raising above about 40 to about 60 degrees Celsius or more. In some examples, the internal surfaces 668 may refer to a rear surface of the internal heat sink 608 that contacts a heat generating component or thermal interface materials (see, e.g., the thermal interface materials 774*a*-774*e* of FIGS. 8A-8B). The position of the heat generating components or the thermal interface materials on the internal surfaces 668 may be oppositely aligned with the external surface 666 of the internal heat sink 608 such that thermal energy is efficiently transferred to the external heat sink or external environment without undesirably interacting with other internal components.

The image capture apparatus 600 includes one or more audio components 670 that function to receive or project audio signals through afront housing (see, e.g., the front housing 602 of FIGS. 6A-6B and 6E) and/or an external heat sink (see, e.g., the external heat sink 606 of FIGS. 6A and 6C-6D). The image capture apparatus 600 may include any number of audio components 670 sufficient to achieve desirable audio properties. The audio components 670 may have one or more thermal pathways between an inside of the image capture device and the external heat sink through a thermal interface material, conductor, or fastener, or the audio components 670 may be thermally insulated from the external heat sink to mitigate thermal energy transfer to a base (see, e.g., the base 622 of FIGS. 6A and 6C-6D) from a component other than fins (see, e.g., the fins 620 of FIGS. 6A and 6C-6D). In some examples, the audio components 670 may be free of thermal contact with or may have thermal pathways to the internal surfaces 668 of the internal heat sink 608 through one or more conductors, thermal interface materials, and/or fasteners.

Figure 7A:
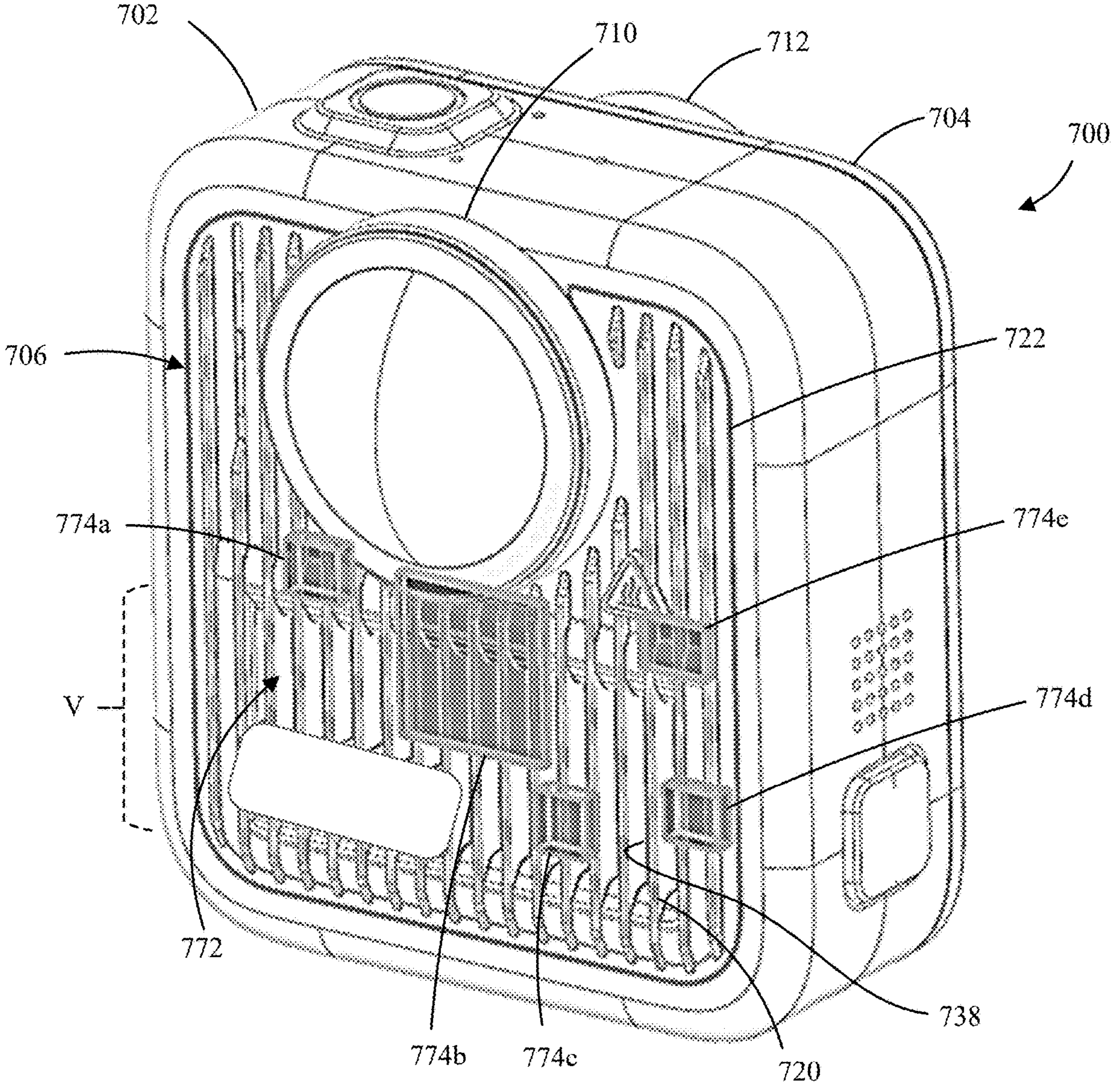
FIG. 7A is a transparent perspective view of an image capture apparatus.

FIG. 7A is a transparent perspective view of an image capture apparatus 700, and the image capture apparatus 700 may be similar to the image capture apparatuses 100, 200, 300, 400, 500, 600 of FIGS. 1A-6B and 6F. The image capture apparatus 700 includes front and rear housings 702, 704 that in combination form a watertight seal around an inside of the image capture apparatus 700. The front and rear housings 702, 704 may be similar to the front and rear housings 602, 604 of FIGS. 6A-6B, 6E, and 6F. An external heat sink 706, which may be similar to the external heat sink of FIGS. 6A and 6C-6D, connects with the front housing 702 and is configured to dissipate thermal energy from an inside of and extend the run (operation) time of the image capture apparatus 700. The front and rear housings 702, 704 each include respective front and rear lens barrels 710, 712, and the front and rear lens barrels 710, 712 may be similar to the front and rear lens barrels 610, 612 of FIGS. 6A-6B and 6F. The external heat sink 706 includes fins 720 that extend from a base 722, and the fins 720 define spaces 738 that provide for a pathway to dissipate thermal energy at a ventilation location 772. The fins 720 may be similar to the fins 620 of FIGS. 6A and 6C-6D. The base 722 may be similar to the base 622 of FIGS. 6A and 6C-6D. The spaces 738 may be similar to the one or more spaces 638 of FIGS. 6A and 6C-6D.

The ventilation location 772 includes each of the spaces 738 and portions of the fins 720 and the base 722 that defines the spaces 738. The ventilation location 772 is configured to exhaust and/or dissipate thermal energy from an external surface of an internal heat sink (see, e.g., the internal heat sink 608 of FIGS. 6A and 6F) so that the run (operation) time of the image capture apparatus 600 is extended. The ventilation location 772 extends from a topmost portion to a bottommost portion of the spaces 738 along a distance V, and the distance V is a distance that may measurable along an external surface of the internal heat sink, along a portion of the fins 720, or both. The distance V may be any distance along the spaces 738 sufficient to dissipate thermal energy to an external environment. The distance V may be a distance that extends from a bottommost portion of the front lens barrel 710 to a bottommost portion of the external heat sink 706 to maximize fluid flow used to dissipate thermal energy from the internal heat sink (not shown).

Figure 7B:
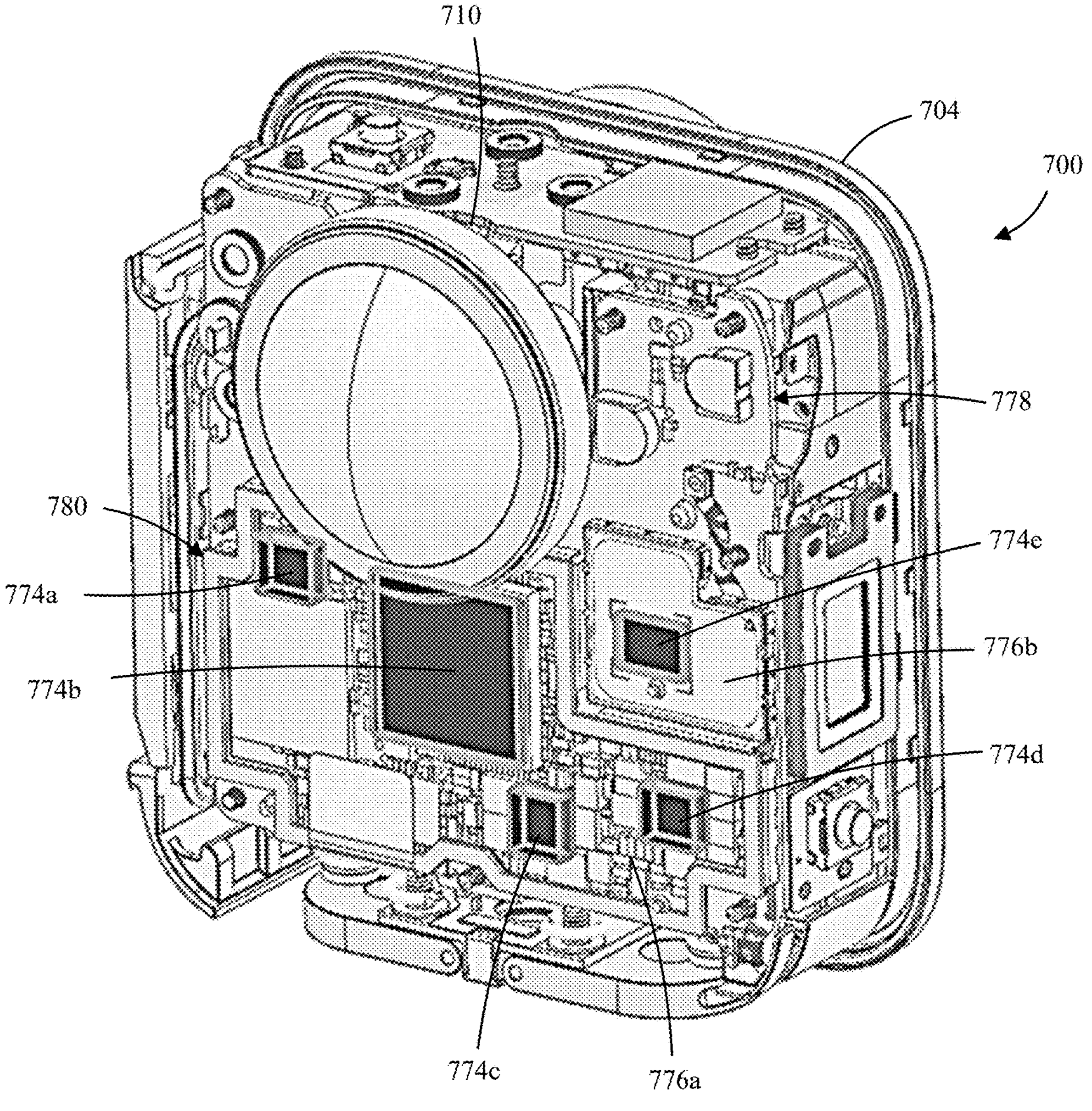
FIG. 7B is a perspective view of the image capture apparatus without an internal heat sink, the external heat sink, and the housing.

The image capture apparatus 700 includes thermal interface materials 774*a*, 774*b*, 774*c*, 774*d*, 774*e* that thermally couple one or more heat generating components (see, e.g., e.g., the heat generating components 776*a*, 776*b* of FIG. 7B) and an internal heat sink (not shown, see e.g., the internal heat sink 608 of FIGS. 6A and 6F) so that thermal energy can be transferred to the internal heat sink. The ventilation location 772 is positioned at the external heat sink 706 and the internal heat sink so that thermal energy transfer from the one or more heat generating components (not shown), to the thermal interface materials 774*a*, 774*b*, 774*c*, 774*d*, 774*e*, and to an external surface of the internal heat sink is maximized. Some of the thermal interface materials 774*a*, 774*b*, 774*c*, 774*d*, 774*e* are positioned along distance V of the ventilation location 772 and others are positioned partially within or adjacent to the ventilation location 772. In some examples, all of the thermal interface materials 774*a*,

774*b*, 774*c*, 774*d*, 774*e* may be positioned within the ventilation location 772 along distance V and/or within the spaces 738 so that thermal energy is desirably transferred across the internal surface to the external surface of the internal heat sink along a shortest cross-section of the internal heat sink.

FIG. 7B is a perspective view of the image capture apparatus 700 showing the internal components and rear housing 704 without an internal heat sink (see, e.g., the internal heat sink 608 of FIGS. 6A and 6F), the external heat sink 706 (see, e.g., the external heat sink 606, 706 of FIGS. 6A, 6C-6D, and 7A), and the front housing (see, e.g., the front housing 602, 702 of FIGS. 6A-6B, 6E, and 7A). The image capture apparatus 700 may be similar to the image capture apparatuses 100, 200, 300, 400, 500, 600 of FIGS. 1A-4B, 6A-6B, and 6F.

Thermal interface materials 774*a*, 774*b*, 774*c*, 774*d*, 774*e* are thermally coupled with heat generating components 776*a*, 776*b* that are located on a printed circuit board 778, and the thermal interface materials 774*a*, 774*b*, 774*c*, 774*d*, 774*e* are configured to connect the heat generating components 776*a*, 776*b* with an internal heat sink (see, e.g., the internal heat sink 608 of FIGS. 6A and 6F) so that thermal energy can be dissipated outside of the image capture apparatus 700 and to an external environment.

As illustrated, the heat generating components 776*a*, 776*b* are located on a printed circuit board 778 that includes an electromagnetic interference gasket 780, which is configured to separate some of the heat generating components 776*a* with others of the heat generating components 776*b*, so that electromagnetic interference between components in the image capture apparatus 700 is mitigated. In combination with the printed circuit board 778 and the internal heat sink, the electromagnetic interference gasket 780 is configured to enclose or form an enclosure around some of the thermal interface materials 774*a*, 774*b*, 774*c*, 774*d* and the heat generating component 776*a* to avoid undesirable interactions with other components inside of the front and rear housings 702, 704. In some examples, the electromagnetic interference gasket 780 encloses the heat generating component 776*a* in an area along the ventilation location 772 and along the distance V, as illustrated in FIG. 7A, so that thermal energy transfer is desirably directed to the ventilation location 772. The electromagnetic interference gasket 780 may be composed of any material sufficient to block electromagnetic waves and/or to direct thermal energy to internal heat sink. For example, the electromagnetic interference gasket 780 may be composed of an insulative or rubber material.

The thermal interface materials 774*a*, 774*b*, 774*c*, 774*d*, 774*e* function to provide a pathway between the internal heat sink and the heat generating components 776*a*, 776*b*. The thermal interface materials 774*a*, 774*b*, 774*c*, 774*d*, 774*e* may function to thermally secure and/or couple the heat generating components 776*a*, 776*b* to the internal heat sink. The thermal interface materials 774*a*, 774*b*, 774*c*, 774*d*, 774*e* may have any physical configuration sufficient to increase or retain surface area between the heat generating components 776*a*, 776*b* and the internal heat sink without negatively impacting thermal energy transfer capabilities or altering the position of each of the heat generating components 776*a*, 776*b*. For example, the thermal interface materials 774*a*, 774*b*, 774*c*, 774*d*, 774*e* may have a configuration of a thermal pad, gels, paste, an adhesive, a tape, a foam, or any combination thereof.

The heat generating components 776*a*, 776*b* may be a processor, a system on a chip, image sensor, battery, or a combination thereof, or any other heat generating component. The printed circuit board 778 may include any number of heat generating components 776*a*, 776*b* (such as between one and twenty heat generating components 776*a*, 776*b*), or the heat generating components 776*a*, 776*b* may be a component separate from the printed circuit board 778. The heat generating components 776*a*, 776*b* may be thermally coupled to one or more internal heat sinks (see, e.g., internal heat sink 608 of FIGS. 6A and 6F or front and/or rear internal heat sinks 808, 809 of FIGS. 8A-8B) such that thermal energy is either directed to a completely internal heat sink (see, e.g., rear internal heat sink 809 of FIG. 8B) or to an internal heat sink with at least one surface exposed to the external environment (see, e.g., the internal heat sink 608 of FIGS. 6A and 6F or front internal heat sink 808 of FIGS. 8A-8B).

Figure 8A:
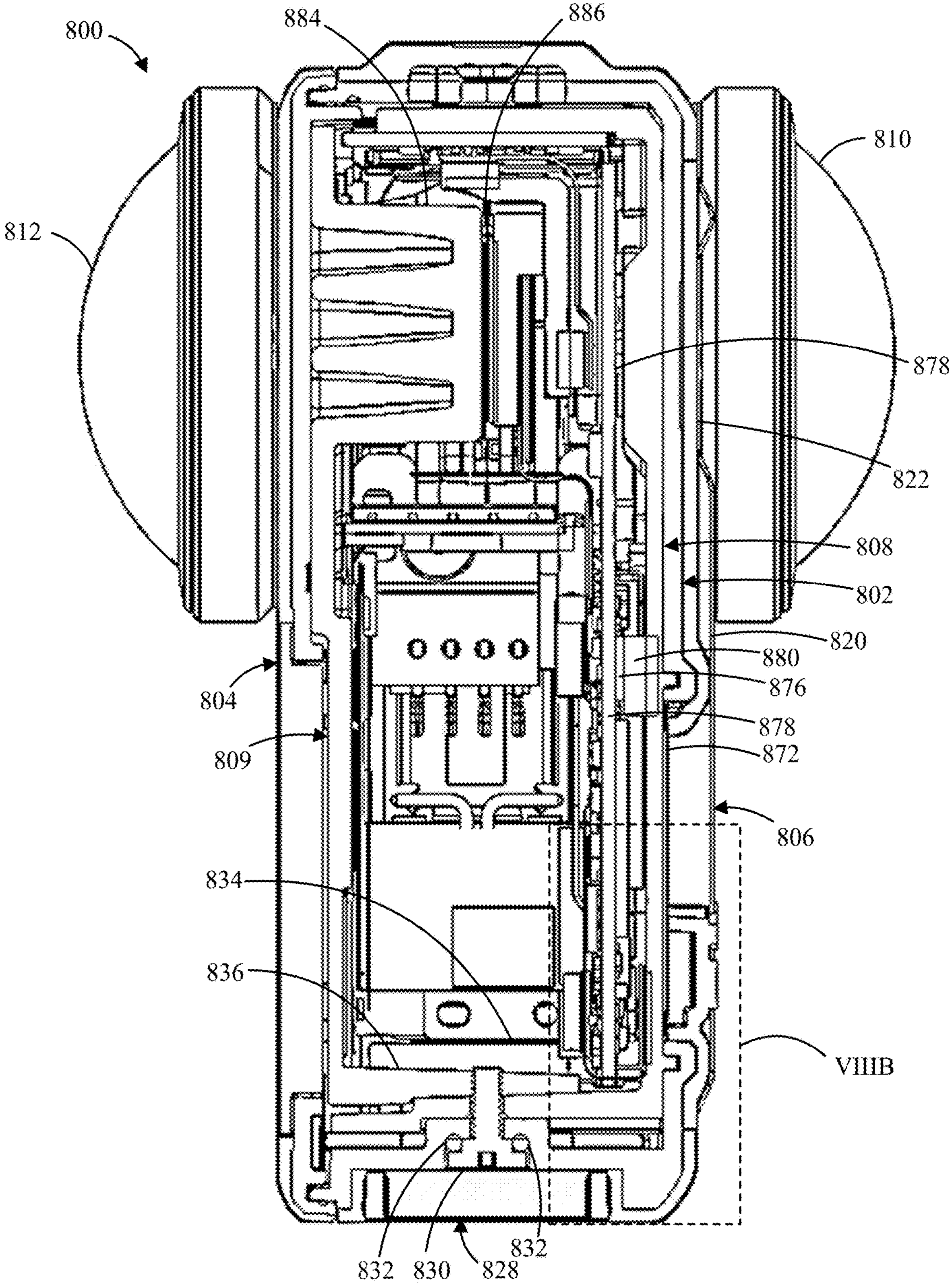
FIG. 8A is a cross-sectional view of an image capture apparatus along line VIII-VIII of FIG. 6A.
Figure 8B:
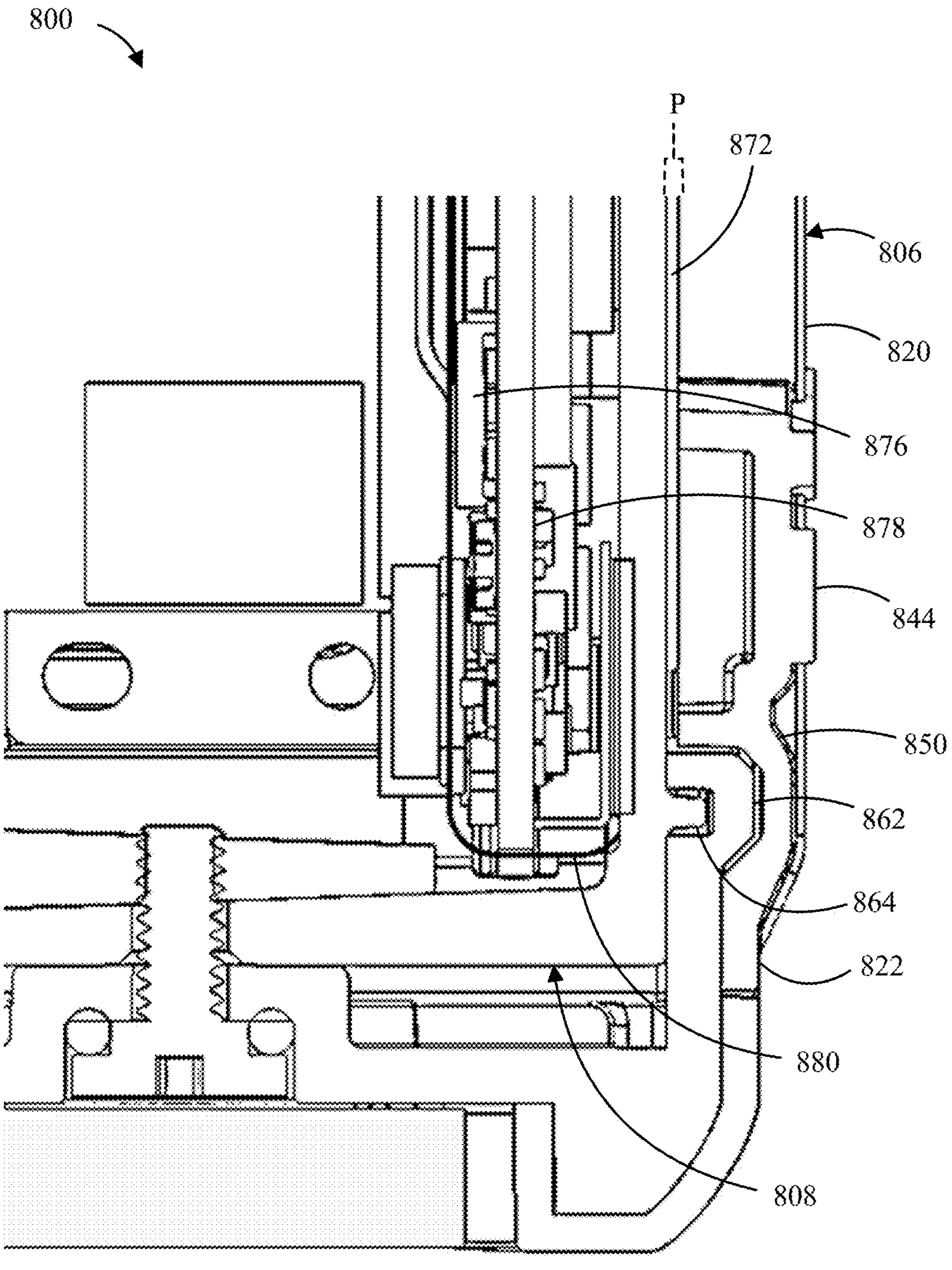
FIG. 8B is a cross-sectional view of the image capture apparatus along line VIII-VIII of FIG. 6A and within box VIIIB of FIG. 8A.

FIG. 8A is a cross-sectional view of an image capture apparatus 800 along line VIII-VIII of FIG. 6A. FIG. 8B is a cross-sectional view of the image capture apparatus 800 along line VIII-VIII of FIG. 6A and within box VIIIB of FIG. 8A. The image capture apparatus 800 includes front and rear housings 802, 804 and an external heat sink 806 that are illustrated as transparent and enclose front and rear internal heat sinks 808, 809. The front and rear housings 802, 804 may be similar to the front and rear housings 602, 604, 702, 704 of FIGS. 6A-7B. The front and rear internal heat sinks 808, 809 may be similar to the internal heat sink 608, 708 of FIGS. 6A, 6F, and 7A. The front and rear housings 802, 804 each respectively include lens barrels 810, 812, and the lens barrels 810, 812 may be similar to the front and rear lens barrels 610, 612, 710, 712 of FIGS. 6A-6B, 6F, and 7A. The external heat sink 806 includes fins 820 that extend between portions of a base 822, and the external heat sink 806 contacts the front housing 802 and is free of contact with the front internal heat sink 808. The fins 820 and the base 822 may be similar to the fins 620 and base 622 of FIGS. 6A and 6C-6D.

In FIG. 8A, at a bottommost portion of the front housing 802, a mounting apparatus 828 is connected with the front housing 802 so that an external apparatus (not shown) can be connected with the image capture apparatus 800. The mounting apparatus 828 may be similar to the mounting apparatus 828 of FIGS. 6B and 6F. The mounting apparatus 828 is connected with the front housing 802 of the image capture apparatus 800 by a fastener 830 that prevents fluids from entering the image capture apparatus 800 by seals 832. The seals 832 may have any desirable arrangement such as in a configuration of a gasket and/or adhesive to prevent fluid exchange with an inside of the image capture apparatus 800 and the external environment. The fastener 830 may have any desirable arrangement sufficient to secure the front housing 602 and the mounting apparatus 828. For example, the fastener 830 may be arranged as a screw, bolt, or snap fit.

The fastener 830 extends through flanges 834, 836 of the respective front and rear internal heat sinks 808, 809. The flanges 834, 836 overlap and contact such that the front and rear internal heat sinks 808, 809 are in thermal communication, thereby forming a thermal coupling, and so that thermal energy is dissipated from either the front or rear internal heat sinks 808, 809 to the other of the front or rear internal heat sinks 808, 809. The fastener 830 extends through the flanges 834, 836 so that thermal energy may additionally be dissipated through the fastener 830 to the mounting apparatus 828, which provides an advantage of dissipating thermal energy from both the external heat sink 806 and the mounting apparatus 828 to the external environment at the same time.

In FIG. 8B, the external heat sink 806 includes a platform 844, which may be similar to the platform 644 of FIGS. 6C-6D, for displaying a logo and/or dissipating thermal energy. Adjacent to the platform 844, portions of an external heat sink gasket 850 and a front housing gasket 862 overlay an internal heat sink mount 864 so that fluids are contained within the ventilation location 872. Each of the external heat sink gasket 850, the front housing gasket 862, and the internal heat sink mount 864 form a contiguous wall around the ventilation location 872 and/or external surface of the front internal heat sink 608. The external heat sink gasket 850 may be similar to the external heat sink gasket 850 of FIGS. 6C-6D; the front housing gasket 862 may be similar to the front housing gasket 662 of FIG. 6E, the internal heat sink mount 864 may be similar to the internal heat sink mount 864 of FIG. 6F, and the ventilation location 872 may be similar to the ventilation location 772 of FIGS. 7A-7B. The internal heat sink mount 864 may define the boundary between internal and external surfaces of the front internal heat sink 808. For example, the internal heat sink mount 864 may form a watertight seal in combination with the front housing gasket 862 so that internal components do not undesirably interact with the external environment.

As illustrated in both FIGS. 8A-8B, the front internal heat sink 808 is free of contact of the external heat sink 806 so that thermal energy transfer between the external and front internal heat sinks 806, 808 is managed. The external and front internal heat sinks 806, 808 are separated by the front housing 802, and the front housing 802 is configured to be a buffer between the base 822 and the front internal heat sink 808. This may additionally be advantageous to insulate thermal energy from the image sensor (see, e.g., the image sensors 914, 916 of FIG. 9B) associated with one of the lens barrels 810, 812 from transferring to the base 822 of the external heat sink 806.

In this configuration, thermal energy is desirably transferred between the front internal heat sink 808 and the fins 820 by fluid flow and/or convection, and the fins 820 dissipate the thermal energy to the base 822, which is free of contact with the front internal heat sink 808. With this configuration, the thermal energy transfer between the external and front internal heat sinks 806, 808 is minimized and/or reduced; the external environment is utilized to provide a cooling effect to the front internal heat sink 808 and other internal components; and the external heat sink 806 is kept at a temperature below a desirable temperature threshold. To effect at least some of these advantages, the external and front internal heat sinks 806, 808 are separated by the ventilation location 872 by a pathway P that is a distance sufficient to allow fluids to traverse the fins 820, contact the front internal heat sink 808, and transfer thermal energy between the external and front internal heat sinks 806, 808. For example, the pathway P may be a distance of about 0.1 mm to about 10 mm.

Within the image capture apparatus 800, heat generating components 876, which may be similar to the heat generating components 776*a*, 776*b* of FIG. 7B, are configured to generate thermal energy and positioned on a printed circuit board 878, which may be similar to the printed circuit board 778 of FIG. 7B. The heat generating components 876 may be positioned on either a side adjacent to the front internal heat sink 808 or on a side separated from the front internal heat sink 808 by the printed circuit board 878. For example, the heat generating components 876 may be thermally coupled to the to an internal surface of the front internal heat sink 808 by a thermal interface material 874, which may be similar to the thermal interface material 774*a*, 774*b*, 774*c*, 774*d*, 774*e* of FIGS. 7A-7B.

In another example, the heat generating components 876 may be thermally coupled with the front internal heat sink 808 by one or more printed circuit board heat conductors 882. The one or more printed circuit board heat conductors 882 may extend along two or more surfaces or one or more corners of the printed circuit board 878 into contact with the front internal heat sink 808. In some examples, the thermal interface material 880 or the one or more printed circuit board heat conductors 882 may thermally couple the heat generating components 876 and one of the flanges 834, 836 of the front and rear internal heat sinks 808, 809 so that thermal energy is additionally conducted to the external environment through the mounting apparatus 828.

Adjacent to the lens barrels 810, 812, a thermal sink 884 of the rear internal heat sink 809 is configured to dissipate thermal energy from image sensors (see, e.g., the image sensors 914, 916 of FIG. 9B) by an image sensor heat conductor 886, which may be a single heat conductor extending between both image sensors or two heat conductors extending from each image sensor. The printed circuit board and the image sensor heat conductors 882, 886 may be similar and may be composed of any material sufficient to conduct thermal energy to the thermal sink 884. For example, the printed circuit board and the image sensor heat conductors 882, 886 may be composed of a flexible or rigid material configured to facilitate thermal energy transfer. By having a thermal sink 884 that is separated from the front internal heat sink 808, the thermal sink 884 of the rear internal heat sink 809 can dissipate energy from the image sensors without loading thermal energy onto the front internal heat sink 808, and this arrangement advantageously distributes thermal energy inside of the image capture apparatus 800, via the rear internal heat sink 809, and outside of the image capture apparatus 800, via front internal heat sink 808 and ventilation location 872.

Figure 9A:
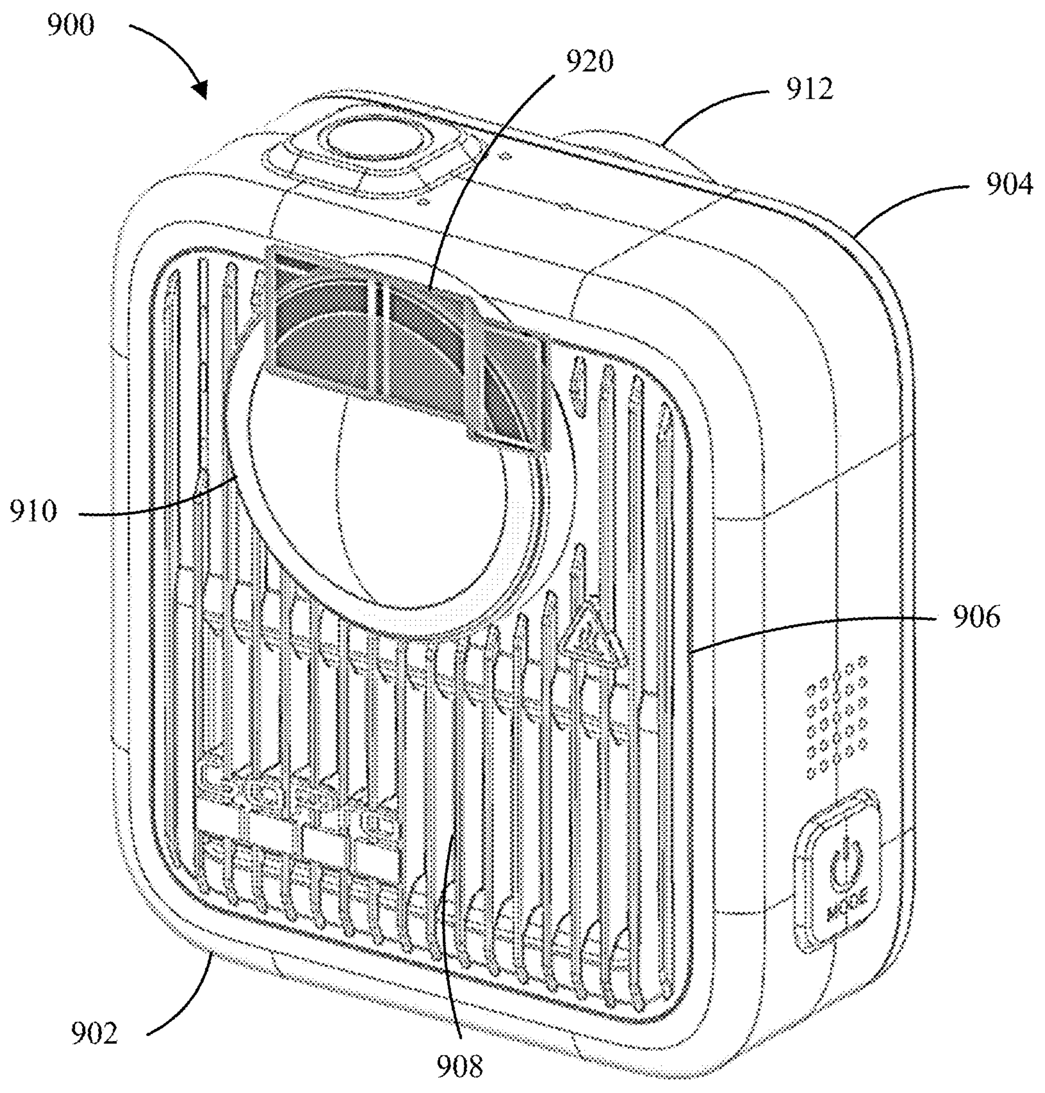
FIG. 9A is a transparent perspective view of an image capture apparatus.
Figure 9B:
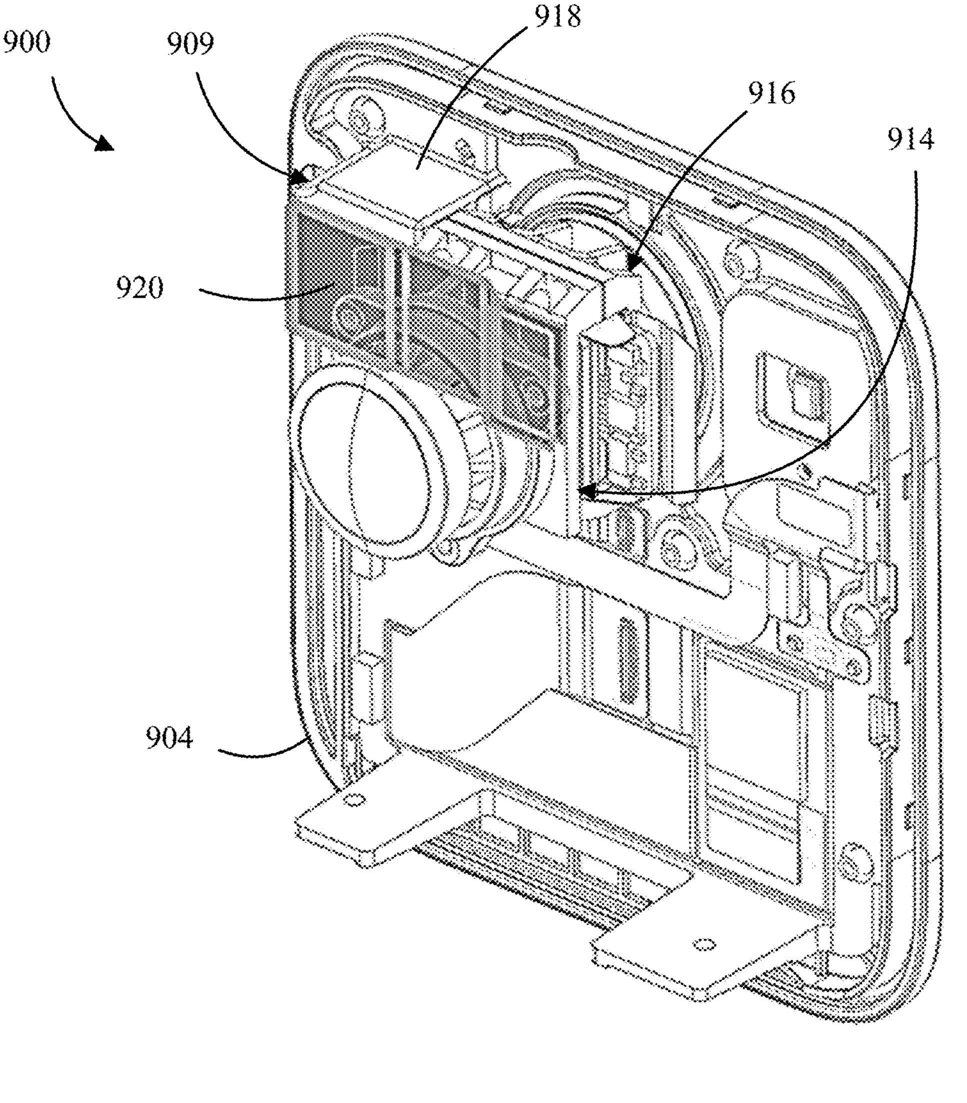
FIG. 9B is a perspective view of the image capture apparatus without a front housing.

FIG. 9A is a transparent perspective view of an image capture apparatus 900, and the image capture apparatus 900 may be similar to the image capture apparatuses 100, 200, 300, 400, 500, 600, 700 of FIGS. 1A-8B. FIG. 9B is a perspective view of the image capture device without a front housing 902. The image capture apparatus 900 utilizes the front housing 602, a rear housing 904, and an external heat sink 906 to enclose a front and rear internal heat sinks 908, 909 that are configured to dissipate thermal energy from the image capture apparatus 900. The front and rear housings 902, 904 may be similar to the front and rear housings 602, 604, 702, 704, 802, 804 of FIGS. 6A-8B; the external heat sink 906 may be similar to the external heat sinks 606, 706, 806 of FIGS. 6A, 6C-6D, 7A, and 8A-8B; and the front and rear internal heat sinks 908, 909 may be similar to the front and rear internal heat sinks 808, 809 of FIGS. 8A-8B.

The front and rear housings 902, 904 additionally each include respective front and rear lens barrels 910, 912 that are configured to receive light and may be similar to the front and rear lens barrels 610, 612, 710, 712, 810, 812 of FIGS. 6A-8B. Each of the front and rear lens barrels 910, 912 are associated with respective front and rear image sensors 914, 916 that are configured to detect images and generate thermal energy in the process of detecting images. Each of the front and rear image sensors 914, 916 are connected with the rear internal heat sink 909 at a thermal sink 918 by a heat conductor 920, such as a graphite sheet, heat pipe, metal, etc., and free of contact with the front internal heat sink 908. By being free of contact with the front internal heat sink 908, thermal energy from the front and rear image sensors 914, 916 is dissipated within the image capture apparatus 900 and the front internal heat sink 908 and the external heat sink 906 are not loaded with the thermal energy from the front and rear image sensors 914, 916. To improve dissipation of thermal energy from the image sensors 914, 916, the thermal sink 918 may have a mass or thickness that is larger than a mass or thickness of other portions of the rear internal heat sink 909, such as an increase by 5 to 100 percent mass or thickness.

In some examples, the heat conductor 920 extends between the front and rear internal heat sinks 908, 909 and the front and rear image sensors 914, 916 so that the thermal energy is dissipated to all of the external and front and rear internal heat sinks 906, 908, 909. In some examples, where only the front internal heat sink 908 is included in the image capture apparatus 900, the heat conductor 920 may direct thermal energy from the front and rear image sensors 914, 916 towards a ventilation location (see, e.g., the ventilation location 772, 872 of FIGS. 7A-8B) of the front internal heat sink 908 and/or the external heat sink 906 to dissipate the thermal energy to an external environment.

The methods and techniques of THERMAL MANAGEMENT SYSTEM described herein, or aspects thereof, may be implemented by an image capture apparatus, or one or more components thereof, such as the image capture apparatus 100 shown in FIGS. 1A-1B, the image capture apparatus 200 shown in FIGS. 2A-2B, the image capture apparatus 300 shown in FIG. 3, the image capture apparatus 400 shown in FIGS. 4A-4B, or the image capture apparatus 500 shown in FIG. 5. The methods and techniques of THERMAL MANAGEMENT SYSTEM described herein, or aspects thereof, may be implemented by an image capture device, such as the image capture device 104 shown in FIGS. 1A-1B, one or more of the image capture devices 204, 206 shown in FIGS. 2A-2B, one or more of the image capture devices 304, 306 shown in FIG. 3, the image capture device 404 shown in FIGS. 4A-4B, or an image capture device of the image capture apparatus 500 shown in FIG. 5.

Figure 10:
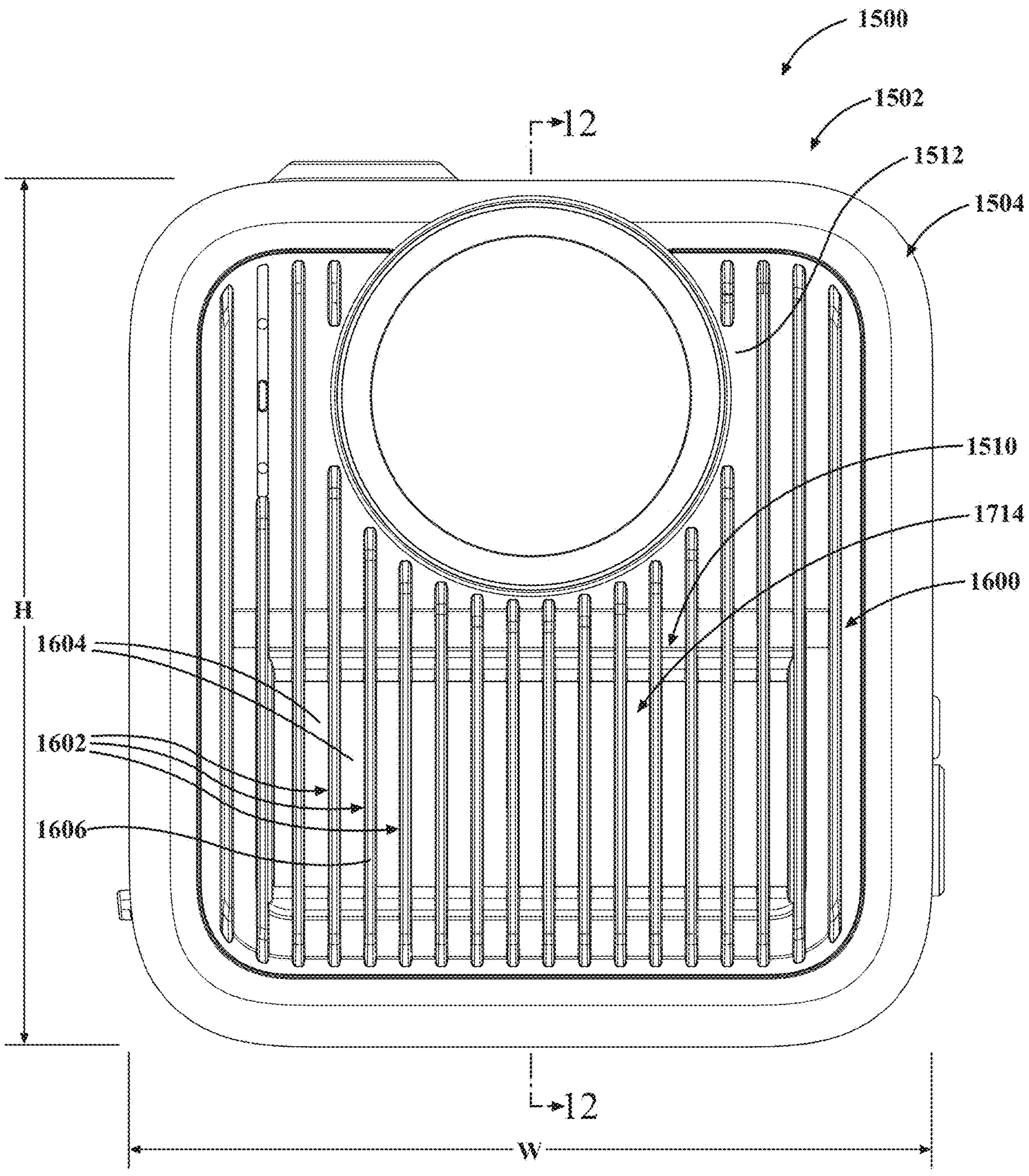
FIG. 10 is a front, plan view of another example of an image capture apparatus.
Figure 11:
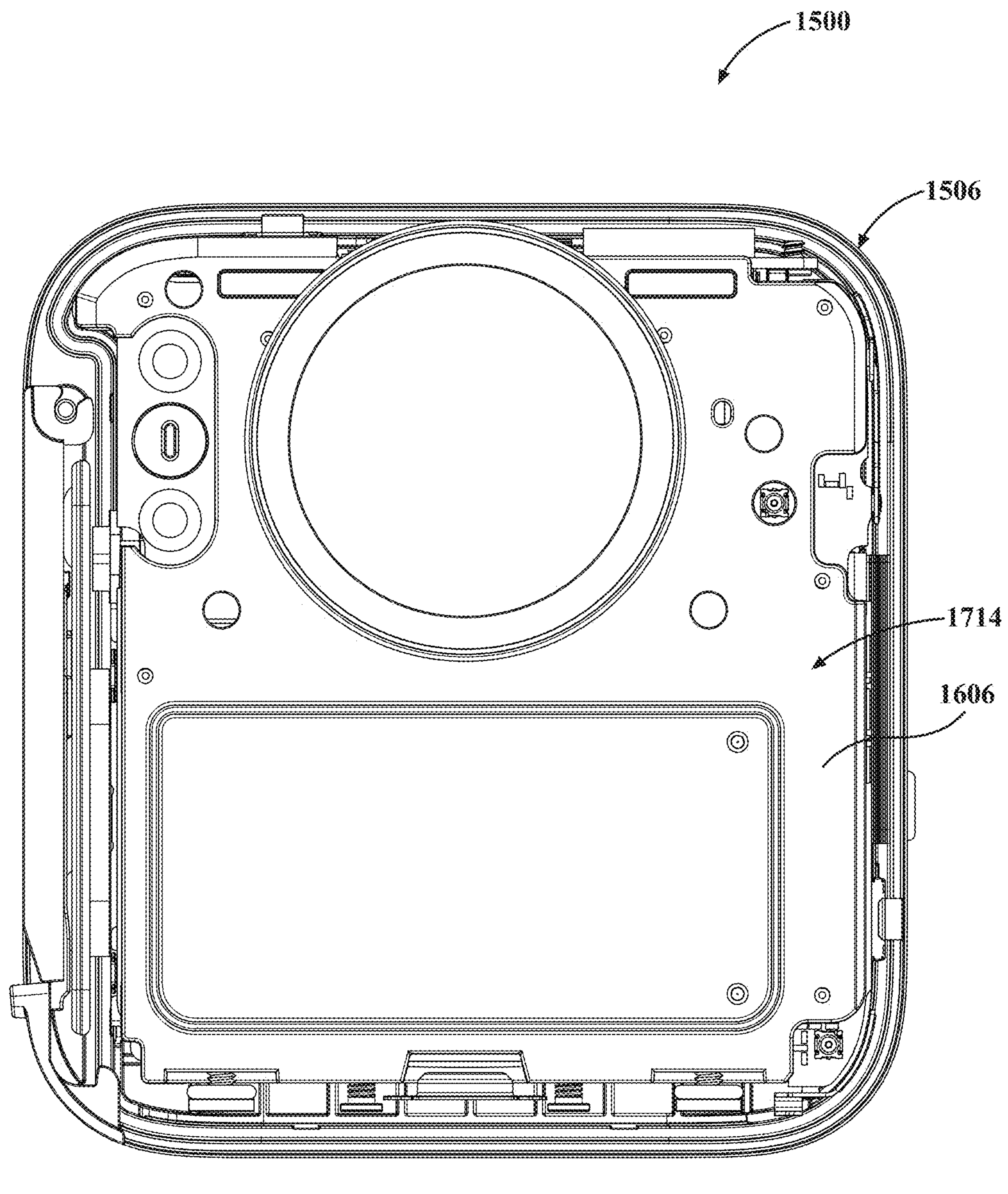
FIG. 11 is a partial, front, plan view of the image capture apparatus seen in FIG. 10.
Figure 12:
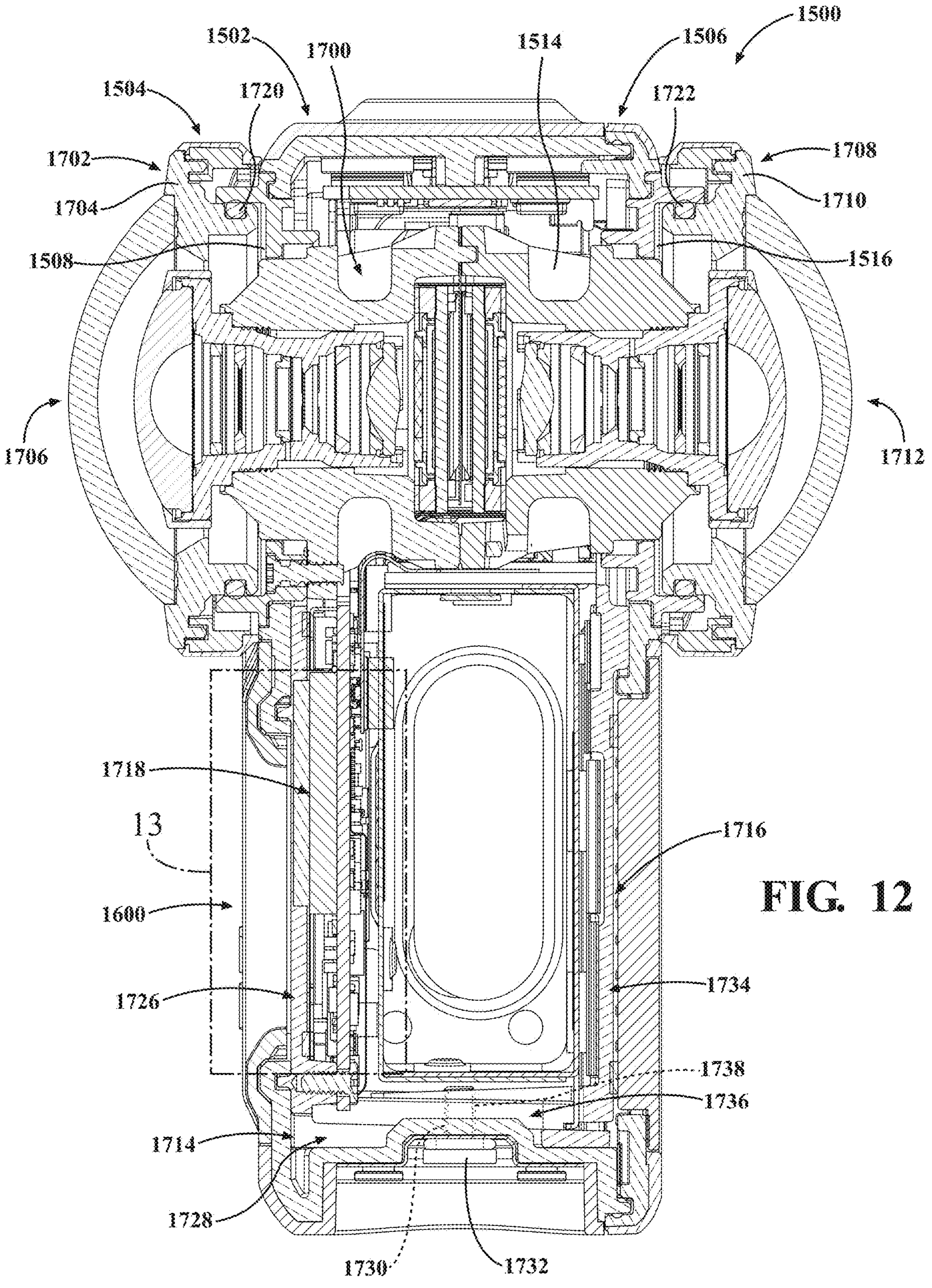
FIG. 12 is a cross-sectional view of the image capture apparatus seen in FIG. 10 taken along line 12-12.
Figure 13:
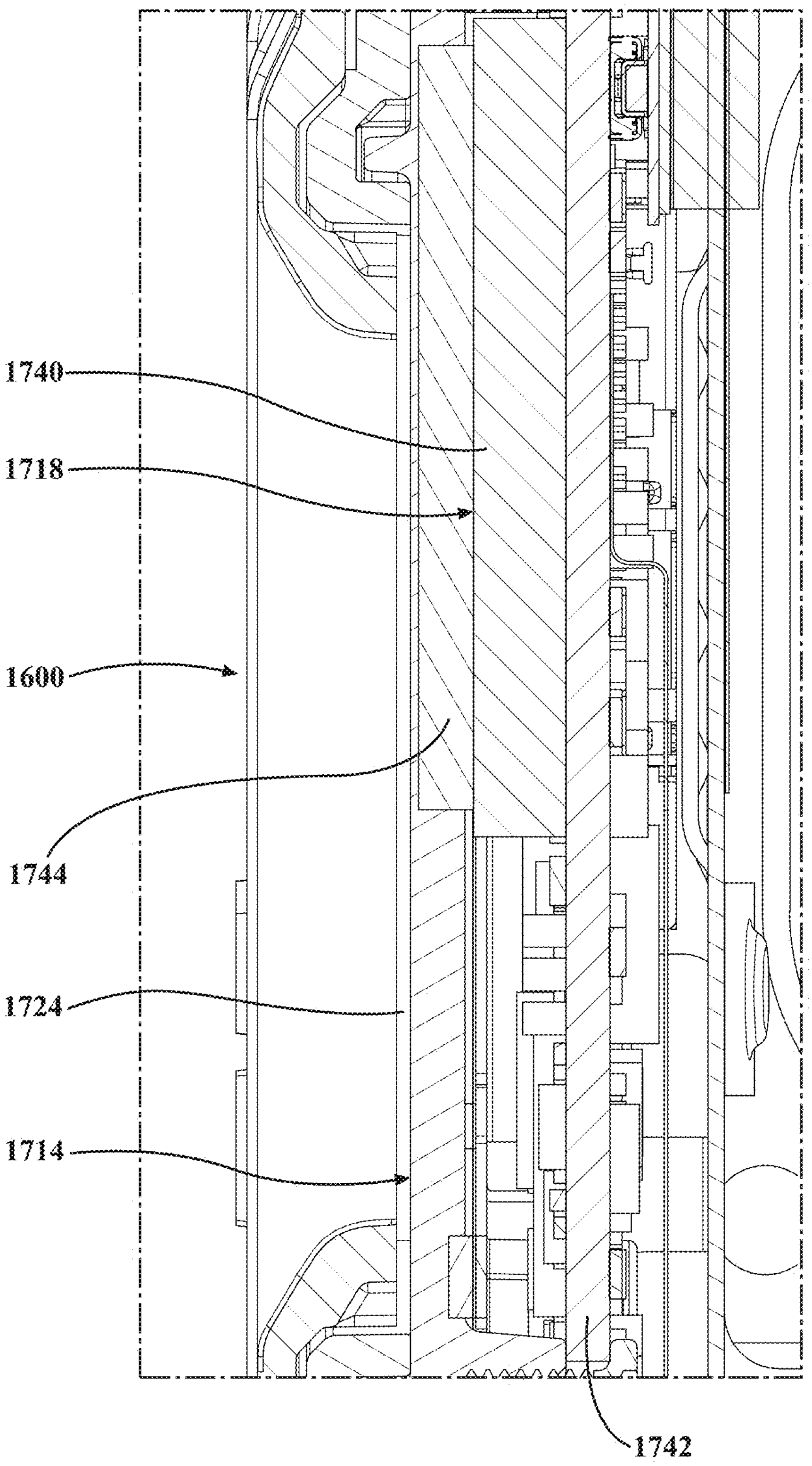
FIG. 13 is an enlargement of the area of detail identified in FIG. 12.

With reference now to FIGS. 10-13, an image capture apparatus 1500 is illustrated that includes features similar to the aforedescribed image capture apparatus 300 (FIG. 3). The image capture apparatus 1500 includes: a housing assembly 1502 with respective front and rear housings 1504, 1506; an external (first, exterior) heat sink 1600 that is supported by (i.e., connected, secured to) the housing assembly 1502; and a variety of internal components 1700, both structural and electrical. As described in detail below, the internal components 1700 (FIG. 12) of the image capture apparatus 1500 include: a front (first) mounting member 1702 (e.g., a front (first) bayonet 1704), which is connected (secured) to the front housing 1504; a front (first) integrated sensor-lens assembly (ISLA) 1706, which includes features similar to the aforedescribed ISLA 326 (FIG. 3); a rear (second) mounting member 1708 (e.g., a rear (second) bayonet 1710), which is connected (secured) to the rear housing 1506; a rear (second) ISLA 1712, which includes features similar to the aforedescribed ISLA 328 (FIG. 3); a front (first, interior) internal heat sink 1714 that is supported by (i.e., connected, secured to) the housing assembly 1502; a rear (second, interior) internal heat sink 1716 that is supported by (i.e., connected, secured to) the housing assembly 1502, and an electronics assembly 1718. More specifically, FIG. 10 is a front, plan view of the image capture apparatus 1500; FIG. 11 is a front, plan view of the image capture apparatus 1500 with the front housing 1504 removed; FIG. 12 is a cross-sectional view of the image capture apparatus 1500 taken along line 12-12 in FIG. 10; and FIG. 13 is an enlargement of the area of detail identified in FIG. 12.

The front housing 1504 defines a (front) opening 1508 (FIG. 12) and a window 1510 (FIG. 10) and provides a framework for and supports various components of the image capture apparatus 1500. For example, the front housing 1504 supports the front mounting member 1702, the front ISLA 1706, the external heat sink 1600, the front internal heat sink 1714, which itself provides a framework for various components, electronics, and circuitry that support operation and various functions of the image capture apparatus 1500, and the rear internal heat sink 1716, as described in further detail below.

The front opening 1508 extends through the front housing 1504 and is configured to receive the front mounting member 1702. More specifically, the front mounting member 1702 is adhesively connected (secured) to the front housing 1504 within the front opening 1508, which obviates the need for any further mechanical connection therebetween.

The window 1510 (FIG. 10) is spaced vertically from the front opening 1508 and is positioned (located) inwardly of (e.g., behind) the external heat sink 1600. The window 1510 extends through the front housing 1504 across a (vertical) height H and a (horizontal) width W thereof and allows heat (e.g., from the front internal heat sink 1714 and the electronics assembly 1718) to vent (flow) through the front housing 1504, which improves thermal distribution and heat dissipation in the image capture apparatus 1500, as described in further detail below.

In the illustrated embodiment, the window 1510 includes a generally rectangular configuration and is dimensioned to span a majority of the width W and approximately half of the height H of the front housing 1504. It is envisioned, however, that the window 1510 may include any configuration and may be dimensioned in any manner suitable for the intended purposes of facilitating air flow through the front housing 1504 and/or improving thermal distribution and heat dissipation in the manner described herein.

The external heat sink 1600 is connected (secured) to an exterior surface 1512 (i.e., an outer face) of the front housing 1504 such that the external heat sink 1600 is positioned (located) forwardly (i.e., in front of, exterior to) the window 1510 and externally of the image capture apparatus 1500. More specifically, the external heat sink 1600 is adhesively bonded to the exterior surface 1512 of the front housing 1504 such that the external heat sink 1600 extends across (spans, overlies) the window 1510, which increases heat dissipation by distributing heat along the exterior surface 1512 of the front housing 1504. The front housing 1504 and the external heat sink 1600 are thus configured as discrete (separate) components of the image capture apparatus 1500. Embodiments in which the front housing 1504 and the external heat sink 1600 may be integrally (monolithically, unitarily) formed (i.e., such that the front housing 1504 and the external heat sink 1600 are formed from a single piece of the material) are also envisioned herein, however, as are embodiments in which the external heat sink 1600 may be mechanically connected to the front housing 1504 via (one or more) at least one mechanical fastener (e.g., screw(s), pin(s), rivet(s), etc.), and would not be beyond the scope of the present disclosure.

As seen in FIG. 10, the external heat sink 1600 includes fins 1602 that extend outwardly in relation to the front housing 1504 (i.e., away from the rear housing 1506). The fins 1602 define vents 1604 (e.g., slits, openings, etc.) therebetween that are configured to facilitate air flow through the external heat sink 1600 and the housing assembly 1502 (i.e., via the window 1510 defined by the front housing 1504), which exposes the front internal heat sink 1714 to ambient air, thereby increasing heat dissipation of the image capture apparatus 1500 (e.g., the flow of heat away from the electronics assembly 1718), as described in further detail below. Although shown as including plate-like configurations and as being oriented in a generally vertical orientation, it is envisioned that the fins 1602 and the vents 1604 may include any configuration suitable for the intended purpose of facilitating air flow through the housing assembly 1502 and heat dissipation in the manner described herein. For example, embodiments in which the fins 1602 and the vents 1604 may be oriented in a generally horizontal orientation are also envisioned herein, as are embodiments in which the fins 1602 may include a pin-like configuration as well as embodiments in which the external heat sink 1600 may include a honeycomb or other such configuration, and such would not beyond the scope of the present disclosure.

In certain embodiments, it is envisioned that the external heat sink 1600 may include a surface finish 1606 (FIG. 10) that is configured to alter (i.e., increase or decrease) the thermal emissivity thereof and, thus, improve heat distribution. Additionally, or alternatively, it is envisioned that the surface finish 1606 may be configured to increase reflectivity and thereby reduce the amount of heat that is being radiated to the image capture apparatus 1500 from the external environment in order to alter the thermal dissipation rate of the image capture apparatus 1500 via radiation (e.g., depending on the intended use case). For example, it is envisioned that the surface finish 1606 of the external heat sink 1600 may be an anodization and/or a coating with a thermally conductive paint.

In the illustrated embodiment, the housing assembly 1502 (i.e., the housings 1504, 1506) include (i.e., are formed from) a (first) non-metallic material (e.g., one or more plastics, polymers, composites, etc.), and the external heat sink 1600 includes (i.e., is formed from) a (second) metallic material (e.g., aluminum). It should be appreciated, however, that the particular materials utilized in construction of the housing assembly 1502 and/or the external heat sink 1600 may be varied in alternate embodiments without departing from the scope of the present disclosure.

The rear housing 1506 is connected (secured) to the front housing 1504 to form a seal therebetween and thereby protect the internal components 1700 from water, dust, debris, etc. More specifically, upon connection of the housings 1504, 1506, the internal components 1700 are sealed within an internal cavity 1514 (FIG. 12) that is collectively defined by the housings 1504, 1506.

The rear housing 1506 supports various thermal and electrical components of the image capture apparatus 1500 (e.g., circuitry and electronics supporting the operation and functionality thereof). For example, it is envisioned that the rear housing 1506 may include one or more flexible printed circuits (FPCs), electrical connectors, one or more conductive elements to facilitate grounding of the rear housing 1506, etc.

The rear housing 1506 defines a rear opening 1516 (FIG. 12) that extends therethrough and which is configured to receive the rear mounting member 1708. More specifically, the rear mounting member 1708 is adhesively connected (secured) to the rear housing 1506 within the rear opening 1516, which obviates the need for any further mechanical connection therebetween.

With reference now to FIGS. 12 and 13 the internal components 1700 will be discussed.

The front ISLA 1706 is positioned (located) within, and extends through, the front housing 1504 and the front mounting member 1702. In order to inhibit (if not entirely prevent) water and/or debris from entering the image capture apparatus 1500 through the front housing 1504 and/or the front mounting member 1702, the front ISLA 1706 includes a front seal 1720 (FIG. 12) (e.g., an O-ring) that is configured for engagement (contact) with the front mounting member 1702.

The rear ISLA 1712 is connected (secured) to the front ISLA 1706 and is positioned (located) within, and extends through, the rear housing 1506 and the rear mounting member 1708. In order to inhibit (if not entirely prevent) water and/or debris from entering the image capture apparatus 1500 through the rear housing 1506 and/or the rear mounting member 1708, the rear ISLA 1712 includes a rear seal 1722 (e.g., an O-ring) that is configured for engagement (contact) with the rear mounting member 1708.

The front internal heat sink 1714 is fixedly connected (secured) to the front housing 1504 and is positioned (located) internally within the image capture apparatus 1500. More specifically, the front internal heat sink 1714 is positioned (located) rearwardly (i.e., behind, interior to) the window 1510 (FIG. 10) within the internal cavity 1514. The heat sinks 1600, 1714 are thus configured as discrete (separate) components of the image capture apparatus 1500 that are positioned on opposite sides of the front housing 1504 and the window 1510 such that front housing 1504 and the window 1510 extend therebetween to separate the heat sinks 1600, 1714 and define an air gap 1724 (FIG. 13). The air gap 1724 extends between the heat sinks 1600, 1714 and, together with the front housing 1504, insulates the front internal heat sink 1714 from the external heat sink 1600, which renders the heat sinks 1600, 1714 devoid of any direct thermal connection, thereby moderating heat transfer therebetween (e.g., when compared to a configuration in which the heat sinks 1600, 1714 may share a direct thermal connection). The moderated heat transfer facilitated by thermal separation of the heat sinks 1600, 1714 allows heat to flow from the front internal heat sink 1714 through the window 1510 to the external heat sink 1600 for distribution across the exterior surface 1512 (FIG. 10) of the front housing 1504 while preventing the temperature of the housing assembly 1502 (e.g., the front housing 1504) from exceeding a predetermined threshold by inhibiting the amount of heat that is removed from the front internal heat sink 1714 to the external heat sink 1600.

In certain embodiments, it is envisioned that the front internal heat sink 1714 may include the aforementioned surface finish 1606 (FIG. 11), which may replace or supplement that which may be included on the external heat sink 1600.

The front internal heat sink 1714 includes a body portion 1726 and a lower flange 1728 that extends rearwardly from the body portion 1726 (e.g., towards the rear housing 1506). The lower flange 1728 defines (one or more) at least one (non-threaded) aperture 1730 that is configured to receive (one or more) at least one mechanical fastener 1732 (FIG. 12) such that the mechanical fastener(s) 1732 extend through the front housing 1504 and through the front internal heat sink 1714, thereby mechanically connecting the front internal heat sink 1714 to the housing assembly 1502 (i.e., the front housing 1504).

The rear internal heat sink 1716 is formed as an additional, independent component of the image capture apparatus 1500 that is discrete (separate) from the front internal heat sink 1714. The rear internal heat sink 1716 is fixedly connected (secured) to the rear housing 1506 and includes a body portion 1734 and a lower flange 1736 that extends forwardly from the body portion 1734 (e.g., towards the front housing 1504). The lower flange 1736 defines (one or more) at least one (threaded) aperture 1738, which is configured to receive the mechanical fastener(s) 1732 (FIG. 12). More specifically, the front internal heat sink 1714 and the rear internal heat sink 1716 are configured such that, upon assembly of the image capture apparatus 1500, the lower flanges 1728, 1736 are in arranged in overlapping, contacting relation, as seen in FIG. 12, which creates a thermal bridge between that allows for the transfer of heat between the internal heat sinks 1714, 1716 and aligns the apertures 1730 with the apertures 1738. Alignment of the apertures 1730, 1738 allows for insertion of the mechanical fastener(s) 1732 through the front housing 1504, through the front internal heat sink 1714 via the apertures 1730, and into threaded engagement with the rear internal heat sink 1716 via the apertures 1738.

In the illustrated embodiment, like the external heat sink 1600, the front internal heat sink 1714, and the rear internal heat sink 1716 include (i.e., are formed from) the (second) metallic material (e.g., aluminum). Embodiments in which the particular material(s) utilized in construction of the front internal heat sink 1714 and the rear internal heat sink 1716 may be varied are also envisioned herein, however, as are embodiments in which the front internal heat sink 1714 and the rear internal heat sink 1716 may include different materials, and would not be beyond the scope of the present disclosure.

The electronics assembly 1718 is configured to support operation and various functions of the image capture apparatus 1500 and includes various electrical, heat-generating components, such as, for example: a main processor 1740 (e.g., a system-on-chip processor); (one or more) at least one printed circuit board 1742; (one or more) at least one Wi-Fi chip; an audio processor; and/or (one or more) at least one integrated circuit (e.g., a power management integrated circuit, etc.). The electronics assembly 1718 is physically and thermally connected to the front internal heat sink 1714 in order to facilitate the dissipation of heat generated during operation of the image capture apparatus 1500. For example, in the illustrated embodiment, the electronics assembly 1718 (e.g., the main processor 1740) is thermally (and directly) connected to the front internal heat sink 1714 by a thermal interface material (TIM) 1744 (e.g., a thermal adhesive, a dielectric pad, etc.) such that heat flows from the electronics assembly 1718, through the TIM 1744, to the front internal heat sink 1714.

With reference again to FIGS. 10-13, operation of the image capture apparatus 1500 will be discussed vis-à-vis heat dissipation and cooling.

During use of the image capture apparatus 1500, the electronics assembly 1718 (FIG. 12) (e.g., the main processor 1740, the printed circuit board(s) 1742, etc.) generates heat, which is communicated (conducted, transmitted) to the front internal heat sink 1714 via the TIM 1744. The heat communicated to the front internal heat sink 1714 is dissipated via the increased air flow through the housing assembly 1502 that is facilitated by the window 1510 in the front housing 1504 and the configuration of the external heat sink 1600. More specifically, air flows through the vents 1604 (FIG. 10) in the external heat sink 1600 through the window 1510 across the air gap 1724 (FIG. 13), which extends between external heat sink 1600 and the front internal heat sink 1714, and onto the front internal heat sink 1714 for distribution across the exterior surface 1512 (FIG. 10) of the front housing 1504, and heat flows from the electronics assembly 1718 through the TIM 1744 to the front internal heat sink 1714 through the front housing 1504 (via the window 1510) to the external heat sink 1600. The external heat sink 1600 and the window 1510 thus facilitate direct, active cooling of the front internal heat sink 1714 to increase the dissipation of heat away from the electronics assembly 1718, which improves operation of the image capture apparatus 1500 by allowing for an increased run time.

While the present disclosure has been described in connection with certain embodiments, it is to be understood that the present disclosure is not to be limited to the disclosed embodiments, but, on the contrary, is intended to cover various modifications and equivalent arrangements included within the scope of the appended claims, which scope is to be accorded the broadest interpretation to encompass all such modifications and equivalent structures as is permitted under the law.

Persons skilled in the art will understand that the various embodiments of the present disclosure and shown in the accompanying figures constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure to achieve any desired result and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the present disclosure, as are alternative embodiments that may result from combining, integrating, and/or omitting features from any of the disclosed embodiments.

Use of the term "optionally" with respect to any element of a claim means that the element may be included or omitted, with both alternatives being within the scope of the claim. Additionally, use of broader terms such as "comprises," "includes," and "having" should be understood to provide support for narrower terms such as "consisting of," "consisting essentially of," and "comprised substantially of." Accordingly, the scope of protection is not limited by the description set out above, but is defined by the claims that follow, and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," "horizontal," "vertical," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "generally," "approximately," "substantially," and the like should be understood to include the numerical range, concept, or base term with which they are associated as well as variations in the numerical range, concept, or base term on the order of up to 25% (e.g., to allow for manufacturing tolerances and/or deviations in design). For example, the term "generally parallel" should be understood as referring to an arrangement in which the pertinent components (structures, elements) subtend an angle therebetween that is equal to 180° as well as an arrangement in which the pertinent components (structures, elements) subtend an angle therebetween that is greater than or less than 180° (e.g., +10%, +15%, +25%). The term "generally parallel" should thus be understood as encompassing configurations in which the pertinent components are arranged in parallel relation. Similarly, the term "generally identical" should be understood as encompassing configurations in which the pertinent components are identical in configuration as well as configurations in which there may be insubstantial variations between the pertinent components that do not influence the substantive construction or performance thereof.

Although terms such as "first," "second," "third," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure, etc.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. An image capture apparatus, comprising:
- a front housing defining a window;
- a rear housing connected to the front housing to define an internal cavity therebetween;
- a front integrated sensor-lens assembly (ISLA) extending through the front housing;
- a first heat sink adhesively bonded to an exterior surface of the front housing such that the first heat sink is located exterior to the window with respect to the internal cavity;
- a rear ISLA extending through the rear housing; and
- a second heat sink mechanically connected to the front housing via at least one mechanical fastener and located interior to the window and within the internal cavity,
- wherein the first heat sink and the second heat sink are devoid of any direct thermal connection.

2. The image capture apparatus of claim 1, wherein the front housing and the rear housing are formed from a non-metallic material, and the first heat sink and the second heat sink are formed from a metallic material.

3. The image capture apparatus of claim 1, wherein at least one of the first heat sink and the second heat sink includes a surface finish configured to increase thermal emissivity thereof.

4. The image capture apparatus of claim 1, wherein the front housing and the first heat sink are configured as discrete components of the image capture apparatus.

5. The image capture apparatus of claim 1, wherein the front housing extends between the first heat sink and the second heat sink to thereby insulate the second heat sink from the first heat sink.

6. The image capture apparatus of claim 1, wherein the first heat sink extends across the window to distribute heat along an exterior surface of the front housing.

7. The image capture apparatus of claim 1, further comprising an electronics assembly connected to second heat sink and configured to support operation of the image capture apparatus.

8. The image capture apparatus of claim 7, wherein the electronics assembly includes a main processor.

9. The image capture apparatus of claim 7, wherein the electronics assembly is connected to the second heat sink via a thermal interface material such that heat flows from the electronics assembly to the second heat sink through the thermal interface material to the first heat sink, thereby improving a run time of the image capture apparatus.

10. An image capture apparatus, comprising:
- a housing assembly defining a window;
- an external heat sink adhesively bonded to the housing assembly; and
- an internal heat sink mechanically connected to the housing assembly via at least one mechanical fastener,
- wherein the external heat sink and the internal heat sink are positioned on opposite sides of the window, and
- whereby heat flows from the internal heat sink through the window to the external heat sink for distribution across an exterior surface of the housing assembly.

11. The image capture apparatus of claim 10, wherein the external heat sink overlies the window.

12. The image capture apparatus of claim 10, wherein the housing assembly includes:
- a front housing defining the window and extending between the internal heat sink and the external heat sink such that the front housing insulates the external heat sink from the internal heat sink to moderate heat transfer therebetween; and
- a rear housing connected to the front housing.

13. The image capture apparatus of claim 10, wherein the housing assembly, the external heat sink, and the internal heat sink are configured as discrete components of the image capture apparatus.

14. An image capture apparatus, comprising:
- a front housing;
- a first heat sink adhesively bonded to an exterior surface of the front housing;
- a rear housing connected to the front housing to define an internal cavity therebetween; and
- a second heat sink mechanically connected to the front housing via at least one mechanical fastener and located within the internal cavity, wherein the first heat sink and the second heat sink are devoid of any direct thermal connection.

15. The image capture apparatus of claim 14, wherein the front housing defines a window.

16. The image capture apparatus of claim 15, wherein the first heat sink and the second heat sink are positioned on opposite sides of the window.

17. The image capture apparatus of claim 15, wherein the front housing, the first heat sink, the rear housing, and the second heat sink are configured such that heat flows from the second heat sink to the first heat sink through the window.

18. The image capture apparatus of claim 17, further comprising:

a front integrated sensor-lens assembly (ISLA) extending through the front housing; and a rear ISLA extending through the rear housing.

19. The image capture apparatus of claim 14, wherein the front housing, the first heat sink, and the second heat sink are configured as discrete components of the image capture apparatus.

20. The image capture apparatus of claim 14, wherein the front housing is formed from a first material, and wherein the first heat sink and the second heat sink are formed from a second material that is different from the first material.

* * * * *